United States Patent
Lopatinsky et al.

(10) Patent No.: US 6,940,200 B2
(45) Date of Patent: Sep. 6, 2005

(54) ELECTRIC DRIVE

(75) Inventors: Edward Lopatinsky, San Diego, CA (US); Lev Fedoseyev, El Cajon, CA (US); Saveliy Rosenfeld, San Diego, CA (US); Daniel Schaefer, Palm Desert, CA (US); Yuriy Fedosov, Saint Petersburg (RU); Rudolf Yevseev, Saint Petersburg (RU); Sergey Khivrich, Lomanosov (RU)

(73) Assignee: ROTYS Inc., San Diego, CA (US)

( * ) Notice: Subject to any disclaimer, the term of this patent is extended or adjusted under 35 U.S.C. 154(b) by 45 days.

(21) Appl. No.: 10/187,071

(22) Filed: Jul. 1, 2002

(65) Prior Publication Data

US 2002/0175582 A1 Nov. 28, 2002

Related U.S. Application Data

(63) Continuation-in-part of application No. 09/621,104, filed on Jul. 21, 2000, now Pat. No. 6,515,390.

(51) Int. Cl.$^7$ .................. H02K 21/12; H02K 31/00; H02K 1/22
(52) U.S. Cl. .................. 310/178; 310/268; 310/156.37; 310/156.64
(58) Field of Search ................ 310/178, 156, 310/156.01, 268, 269, 261, 254, 186.04, 156.32, 156.33, 156.34–156.37, 156.65, 179–184, 156.64

(56) References Cited

U.S. PATENT DOCUMENTS

| | | | | |
|---|---|---|---|---|
| 4,127,802 A | * | 11/1978 | Johnson | 318/696 |
| 4,268,095 A | * | 5/1981 | Millner | 310/90.5 |
| 4,763,402 A | * | 8/1988 | Powilleit | 29/596 |
| 4,902,923 A | * | 2/1990 | Okauchi | 310/268 |
| RE33,628 E | * | 7/1991 | Hahn | 310/268 |
| 5,175,459 A | * | 12/1992 | Danial et al. | 310/81 |
| 5,379,999 A | * | 1/1995 | Barzideh et al. | 271/264 |
| 5,440,185 A | * | 8/1995 | Allwine, Jr. | 310/156.37 |
| 5,552,653 A | * | 9/1996 | Nose | 310/263 |
| 6,043,578 A | * | 3/2000 | Lamb | 310/92 |
| 6,278,212 B1 | * | 8/2001 | Kalsi | 310/162 |
| 6,515,390 B1 | * | 2/2003 | Lopatinsky et al. | 310/178 |
| 2002/0067091 A1 | * | 6/2002 | Kliman et al. | 310/156.01 |

* cited by examiner

*Primary Examiner*—Darren Schuberg
*Assistant Examiner*—Julio Gonzalez

(57) ABSTRACT

The invention refers to magnetoelectric machines and comprises a rotor made in the form of at least two disks, the magnetized disks have circumferential arrayed like poles and an axially magnetized polygon or cylindrical magnet placed between the disks. The stator comprises a winding selected from the group consisting of a coil winding and a wave winding coils that are distributed over the circumference and are installed predominantly in the space between the rotor poles provides for the possibility of the end face interaction with the rotor poles. Each of at least two disks could be made of a non-ferrous material with embedded magnets, and rotor further comprises ferrous metal plates, each of the plates is attached on an outer surface of each disk and comprises a ferrous metal cylinder for interconnecting a magnetic flux between ferrous metal plates. The rotor could be made as a multi-sectional unit. The disks could be made integral with a magnet in such a manner that they serve as magnet's poles. It becomes possible to reduce the radial size of the device. A plate-like shape of the disks makes it possible to optimize the size of the device depending on the magnet and stator used, required power and the size of a device, in which this electric drive is supposed to be mounted.

3 Claims, 31 Drawing Sheets

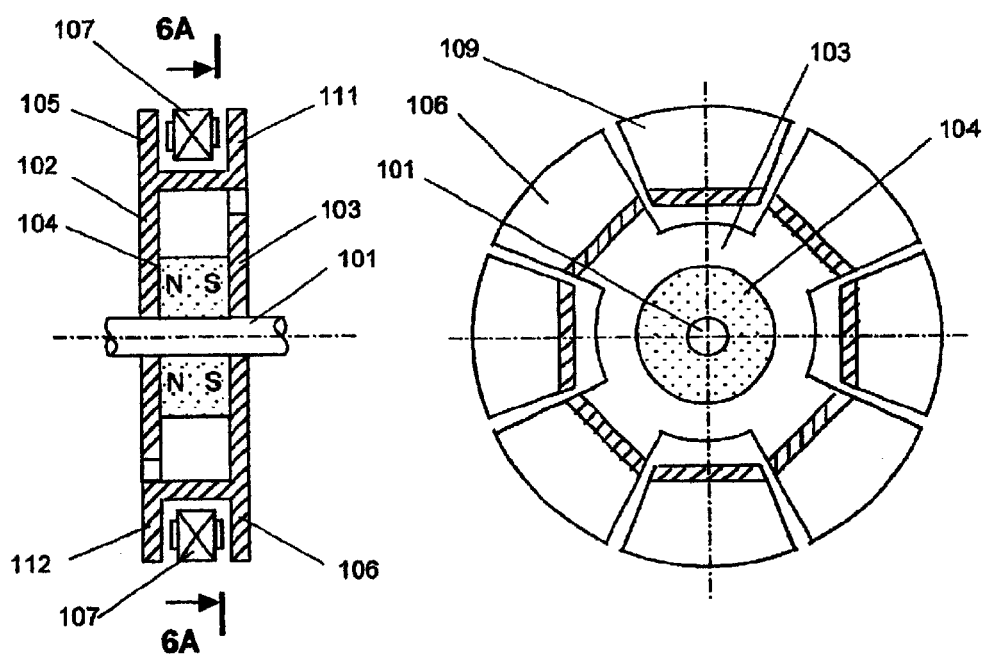
Fig. 6                    Fig. 6A
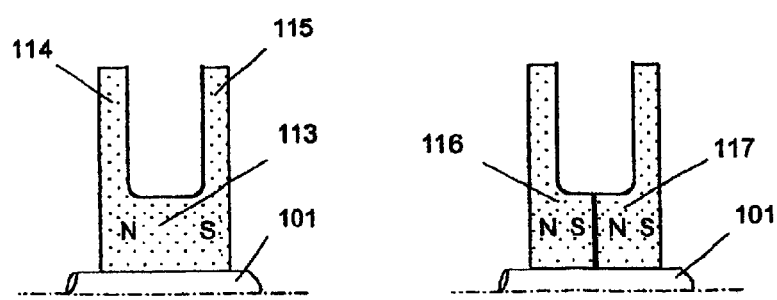
Fig. 7                    Fig. 8

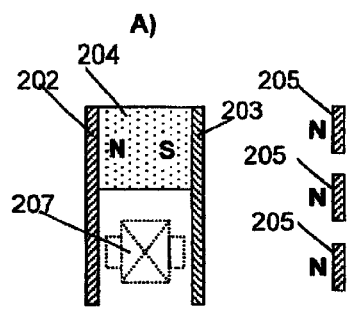
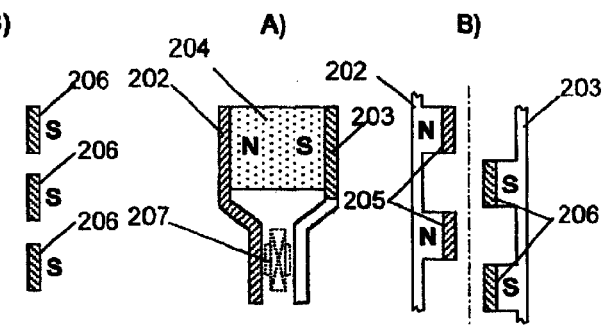
Fig. 14　　　　　　　　Fig. 15
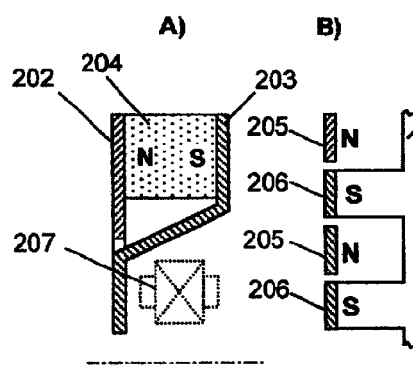
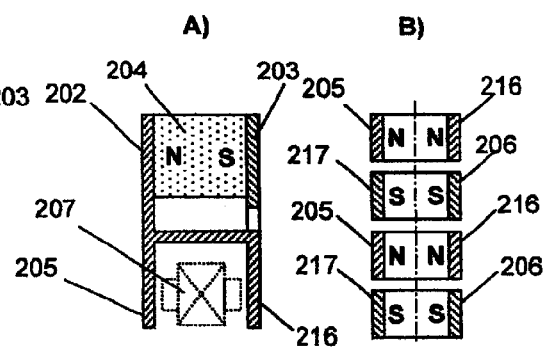
Fig. 16　　　　　　　　Fig. 17
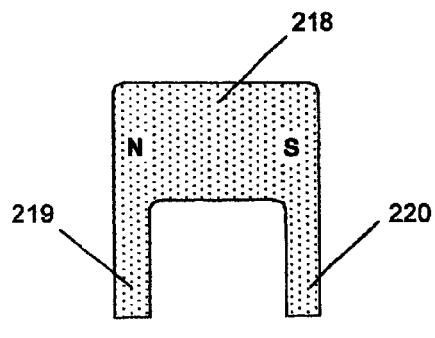
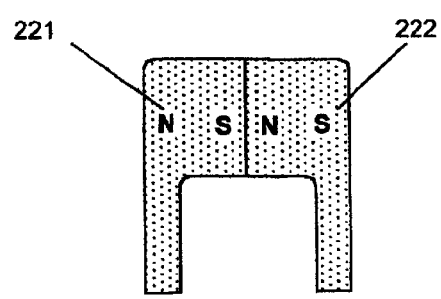
Fig. 18　　　　　　　　Fig. 19

ELECTRIC DRIVE

CROSS-REFERENCE TO RELATED APPLICATIONS

The present application is a continuation-in-part of U.S. patent application Ser. No. 09/621,104, filed Jul. 21, 2000 now U.S. Pat. No. 6,515,390 entitled "ELECTRIC DRIVE OPTIONS".

FIELD OF THE INVENTION

The invention covered by this application is related to electric engineering, in particular, to magneto electric machines, and may be used in the manufacture of electric drives for various purposes, e.g. fans and blowers, ventilation plants, compressors, wheels of electrically driven automobiles etc.

BACKGROUND INFORMATION

Well-known are machines of end-face rotor-stator interaction type, where the rotor is a disk, on the end surfaces whereof permanent magnets of alternating polarity are located over the circumference. The stator of such machines is made in the shape of a disk (ring), installed coaxially with the rotor, electromagnetic stator coils being located at the end faces of the stator. For instance, the direct current brushless electric motor (electric drive) described in U.S. Pat. No. 5,440,185, IPC 6 H02K 21/12 belongs to this type of electric machines. The known device includes at least one rotor installed on the shaft and made as a multi-pole magnetic disk consisting of sections spaced along the circumference, where the polarity of the sections alternates. The device also includes at least one disk-shaped stator element, determining the rotor position, the device for mounting the rotor (rotors) and stator element (elements) on the common axle, the sensor for positioning the multi-pole magnetic disk versus the stator element and a device to identify the magnetic field profile in the stator elements. Two windings are wound over the stator elements, electric current being fed to one of those thus determining the polarity of the stator poles. The known device is not easy in manufacturing, the biggest difficulty being manufacturing of disk-shaped rotors with magnetic poles of alternating polarity.

The closest analogue to the invention being claimed is an electric machine with a rotor having claw-shaped poles (V. A. Balagurov, F. F. Galateyev. Electric Generators with Permanent Magnets.—Moscow: "Energiya", 1988, pp. 31–32). The rotor in a machine of this type is a polygon or cylindrical, axially magnetized permanent magnet; to the end surfaces whereof two disks with horns jutting out like "claws" on the poles are fixed. The disks are made of magnetically soft material, all poles of one disk being northern, and of the other one—southern. The pole horns are oriented in parallel to the generatrix of the permanent magnet cylinder while the rotor disks are shifted against each other in such a way that the poles of the one are between the poles of the other.

In order to increase the power of the machine, the rotor is made of multiple sections. At that several sections are mounted on the same shaft, each consisting of two disks with claw-shaped poles and a polygon or cylindrical magnet magnetized in the axial direction located between them. When the multi-sectional rotor is being assembled, the magnets in the adjacent sections are oriented towards each other respect to their like poles.

The known designs of electric machines with claw-shaped rotors have an advantage of being equipped with only one magnet tightly fixed between two disks. This ensures high impact strength of the rotor. At the same time such rotors are rather difficult to manufacture. Besides, at high revolutions under the influence of centrifugal forces the "claws" may bend out. To prevent this the device should be reinforced, which results in its heavier weight. Since it is radial interaction between the rotor and the stator that is actualized in the known design, the machines of this type are of great radial dimensions.

OBJECT AND SUMMARY OF THE INVENTION

The engineering problem to be solved with the help of the invention in question is the development of an electric drive simple in manufacturing, reliable and compact. Several embodiments of addressing this problem are being claimed.

The essence of the invention in conformity with the first embodiment consists in that in the known electric drive, the rotor whereof is made of two magnetized disks mounted on a shaft with poles distributed over the outer circumference and a polygon or cylindrical magnet located between the disks and magnetized in the axial direction, in such a manner that the poles of each disk are the like ones, and in regard to the poles of the other disk—the unlike ones, the stator being made of coils distributed over the circumference, while in accordance with the invention the rotor poles are formed by the magnetized teeth located over the outer circumference of both magnetized disks in planes perpendicular to the axis of the device, and the poles of the stator coils are arranged in such a way as to allow for their end-face interaction with the rotor poles.

Unlike the known design, the rotor of the device being the subject of the application has no claw-shaped pole horns (poles). The rotor poles are formed by teeth located over the outer circumference of both disks, which function as magnetic circuits. This ensures streamlined manufacturing of the rotor and its structural strength. Owing to the fact that the rotor poles are located over the outer circumference of both disks in planes perpendicular to the axis of the device, and the poles of the stator are arranged in such a way as to allow for their end-face interaction with the rotor poles, there arises an opportunity to make the radial size of the device smaller.

As a particular example, the stator poles may be located in the space between the above-mentioned rotor poles outfitted on both disks. This will make it possible to raise the power of the drive, as the magnetic field in the space between the rotor poles will have the highest intensity.

The rotor's magnetized disks, one or both of them, may be made as flat disks with teeth-poles over the outer circumference, and in this case the rotor poles will be in the same plane with the respective disk, or they may have a plate-like shape. This permits obtaining a the device of optimum size independent of the magnet used, stator, rotor, the required power, and the size of the equipment where the electric drive is supposed to be installed.

Independent of the stator design the rotor poles of one disk may be located in the axial direction opposite the rotor poles of the other disk, or between them. Taking in view the fact that the operating principle of such devices is based on alternate switching of the stator coils distributed over the circumference, whose magnetic fields interacts with the rotor poles, this latter option of rotor pole arrangement provides for a steadier rotation of the rotor, since it practically increases the total number of rotor poles by a factor of 2.

In addition, the rotor poles on each disk may have an L-shaped pole horn, with one "leg" oriented in the axial direction, and the other one located between the rotor poles of the other disk in the same plane with those. This will make it possible to focus the magnetic field of the rotor thus increasing the power of the electric drive.

The rotor may be manufactured in such a way that the disks are integrated with the magnet serving as its poles. This will require a magnet of a sophisticated configuration, thereby raising the intensity of the magnetic field in the gap between the rotor poles. Another feasible option is to manufacture the magnet of two symmetrical parts joined along the plane perpendicular to the axis of the device. In this case both the manufacturing of the magnet and the assembling process of the device are made easier.

The essence of the invention in conformity with the second embodiment consists in that in the known electric drive, the rotor whereof is made of one or a number of sections, each consisting of two magnetized disks mounted on a shaft with poles distributed over the outer circumference and a polygon or cylindrical magnet located between the disks and magnetized in the axial direction, in such a manner that the poles of each disk are the like ones, and in regard to the poles of the other disk—the unlike ones, the rotor poles of one disk located between the rotor poles of the other disk, and the stator being made of coils distributed over the circumference, while in accordance with the essence of the invention in conformity with the first embodiment consists that in the known electric drive, the rotor whereof is made of two magnetized disks mounted on a shaft with poles distributed over the outer circumference and a polygon or cylindrical magnet located between the disks and magnetized in the axial direction, in such a manner that the poles of each disk are the like ones, and in regard to the poles of the other disk—the unlike ones, the stator being made of coils distributed over the circumference, while in accordance with the invention the rotor poles are formed by the magnetized teeth located over the outer circumference of both magnetized disks in planes perpendicular to the axis of the device, and the poles of the stator coils are arranged in such a way as to allow for their end-face interaction with the rotor poles.

Unlike the known design, the rotor of the device being the subject of the application has no claw-shaped pole horns (poles). The rotor poles are formed by teeth located over the outer circumference of both disks which function as magnetic circuits. This ensures streamlined manufacturing of the rotor and its structural strength. Owing to the fact that the rotor poles are located over the outer circumference of both disks in planes perpendicular to the axis of the device, and the poles of the stator are arranged in such a way as to allow for their end-face interaction with the rotor poles, there arises an opportunity to make the radial size of the device smaller.

As a particular example, the stator poles may be located in the space between the above-mentioned rotor poles outfitted on both disks. This will make it possible to raise the power of the drive, as the magnetic field in the space between the rotor poles will have the highest intensity.

The rotor magnetized disks, one or both of them, may be made as flat disks with teeth—poles over the outer circumference, and in this case the rotor poles will be in the same plane with the respective disk, or they may have a plate-like shape. This permits obtaining device of optimum size independent of the magnet used, stator, rotor, the required power, and the size of the equipment where the electric drive is supposed to be installed.

Independent of the stator design the rotor poles of one disk may be located in the axial direction both opposite the rotor poles of the other disk, or between them. Taking in view the fact that the operating principle of such devices is based on alternate switching of the stator coils distributed over the circumference, whose magnetic field interacts with the rotor poles, this latter option of rotor pole arrangement provides for a steadier rotation of the rotor, since it practically increases the total number of rotor poles by a factor of 2.

In addition, the rotor poles on each disk may have an L-shaped pole horn, with one "leg" oriented in the axial direction, and the other one located between the rotor poles of the other disk in the same plane with those. This will make it possible to focus the magnetic field of the rotor thus increasing the power of the electric drive.

The rotor may be manufactured in such a way that the disks are integrated with the magnet serving as its poles. This will require a magnet of a sophisticated configuration, thereby raising the intensity of the magnetic field in the gap between the rotor poles. Another feasible option is to manufacture the magnet of two symmetrical parts joined along the plane perpendicular to the axis of the device. In this case both the manufacturing of the magnet and the assembling process of the device are made easier.

The essence of the invention in conformity with the second embodiment consists in that in the known electric drive, the rotor whereof is made of one or a number of sections, each consisting of two magnetized disks mounted on a shaft with poles distributed over the outer circumference and a polygon or cylindrical magnet located between the disks and magnetized in the axial direction, in such a manner that the poles of each disk are the like ones, and in regard to the poles of the other disk—the unlike ones, the rotor poles of one disk located between the rotor poles of the other disk, and the stator being made of coils distributed over the circumference, while in accordance with invention in each section of the rotor one or both disks are plate-shaped, and the rotor poles are formed by teeth located over the outer circumference of both disks in the same plane perpendicular to the axis of the device, the poles of the stator coils being arranged in such a way as to allow for their end-face interaction with the rotor poles.

Just like it is with the first embodiment, unlike the known design, the rotor of the device being the subject of the application has no claw-shaped pole horns (poles). Teeth located over the outer circumference of both magnetized disks form the rotor poles. This ensures streamlined manufacturing of the rotor and its structural strength. Owing to the fact that the rotor poles are located over the outer circumference of both disks in planes perpendicular to the axis of the device, which is attained through the plate-like configuration of the disks, and the poles of the stator are arranged in such a way as to allow for their end-face interaction with the rotor poles, there arises an opportunity to make the radial size of the device smaller.

In the case of a multi-sectional rotor the adjacent disks are joined together in the way of the polygon or cylindrical magnets, and the polygon or cylindrical magnets of the adjacent sections are oriented towards each other with their like poles. Making the drive multi-sectional allows for its power to be increased.

Just like with the first embodiment, independent of the stator design the poles of adjacent disks of a multi-sectional rotor may be positioned in the axial direction both opposite each other, or in the gaps between each other. The latter arrangement provides for a steadier rotation of the rotor.

In addition, in the case when the poles of adjacent disks of a multi-sectional rotor are positioned in the gaps between each other, these adjacent disks may be made as one disk with poles for both adjacent sections.

Like with the first embodiment, it is possible to manufacture the rotor in such way that the disks are integrated with the magnet serving as its poles, including a design when the magnet is manufactured of two symmetrical parts joined along the plane perpendicular to the axis of the device.

The principal difference between the first two embodiments and the third and the fourth embodiments is in that under the first and the second embodiments the rotor poles are formed by the teeth located over the outer circumference of the disks, while under the third and the fourth embodiments the rotor poles are formed by the teeth located over the inner circumference of the disks.

The essence of the invention in conformity with the third embodiment consists that in the known electric drive, the rotor whereof is made of two disks with the poles distributed over the circumference and a polygon or cylindrical magnet located between the disks and magnetized in the axial direction, in such a manner that the poles of each disk are the like ones, and in regard to the poles of the other disk—the unlike ones, and the stator being made of coils distributed over the circumference, while in accordance with the invention the rotor poles are formed by teeth arranged over the inner circumference of both disks, oriented towards the axis of the device and located in the planes perpendicular to the axis of the device, while the poles of the stator coils being arranged in such a way as to allow for their end-face interaction with the rotor poles. Due to the fact that the rotor poles are arranged over the inner circumference of the disks towards the axis of the device, the polygon or cylindrical magnet will have the maximum radial dimension for the given radial dimension of the device itself. This permits to significantly increase the power of the electric drive.

Owing to the fact that the rotor poles are located in planes perpendicular to the axis of the device, and the poles of the stator are arranged in such a way as to allow for their end-face interaction with the rotor poles, there arises an opportunity to make the axial dimension of the device smaller.

As a particular example, the stator poles may be located in the space between the above-mentioned rotor poles outfitted on both disks. This will make it possible to raise the power of the drive as the magnetic field in the space between the rotor poles will have the highest intensity.

The rotor disks, one or both of them, may be made either as flat disks with teeth—poles over the inner circumference, and in this case the rotor poles will be in the same plane with the respective disk, or they may have a plate-like shape. This permits obtaining device of the optimum size independent of the magnet, stator, or rotor used, the required power, and the size of the equipment where the electric drive is supposed to be installed.

Independent of the stator design the rotor poles of one disk may be positioned in the axial direction opposite the rotor poles of the other disk, or between them. Taking in view the fact that the operating principle of such devices is based on alternate switching of the stator coils distributed over the circumference, whose magnetic field interacts with the rotor poles, this latter option of rotor pole arrangement provides for a steadier rotation of the rotor, since it practically increases the total number of rotor poles by a factor of two.

In addition, the rotor poles on each disk may have an L-shaped pole horn, with one "leg" oriented in the axial direction, and the other one located between the rotor poles of the other disk in the same plane with those. This will make it possible to focus the magnetic field of the rotor thus increasing the power of the electric drive.

The rotor may be manufactured in such a way that the disks are integrated with the magnet serving as its poles. This will require a magnet of a sophisticated configuration, however, eliminating losses in magnetic circuit disks, thereby raising the intensity of the magnetic field in the gap between the rotor poles. Another feasible option is to manufacture the magnet of two symmetrical parts joined along the plane perpendicular to the axis of the device. In this case both the manufacturing of the magnet and the assembling process of the device are made easier.

The essence of the invention in conformity with the fourth embodiment consists that in the known electric drive, the rotor whereof is made of one or a number of sections, each consisting of two disks with poles distributed over the circumference and a polygon or cylindrical magnet located between the disks and magnetized in the axial direction, in such a manner that the poles of each disk are the like ones, and in regard to the poles of the other disk—the unlike ones, the rotor poles of one disk located between the rotor poles of the other disk, and the stator being made of coils distributed over the circumference, while in accordance with the invention in each section of the rotor one or both disks are plate-shaped, and the rotor poles are formed by teeth arranged over the inner circumference of both disks, oriented towards the axis of the device and located in the same plane perpendicular to the axis of the device, the poles of the stator coils being arranged in such a way as to allow for their end-face interaction with the rotor poles.

Just like it is with the third embodiment, unlike the known design, the rotor of the device being the subject of the application has no claw-shaped pole horns (poles). Teeth located over the inner circumference of both disks form the rotor poles. This ensures a properly streamlined manufacturing of the rotor and its structural strength.

Owing to the fact that the rotor poles are positioned in the same plane perpendicular to the axis of the device, which is attained through the plate-like configuration of the disks, and the poles of the stator are arranged in such a way as to allow for their end-face interaction with the rotor poles, there arises an opportunity to make the radial size of the device smaller.

Like it is with the third embodiment, due to the fact that the rotor poles are arranged over the inner circumference of the disks towards the axis of the device, the polygon or cylindrical magnet will have the maximum radial dimension for the given radial dimension of the device itself. This permits to significantly increase the power of the electric drive.

In the case of a multi-sectional rotor the adjacent disks are joined together in the way of the polygon or cylindrical magnets, and the polygon or cylindrical magnets of the adjacent sections are oriented towards each other with respect to their unlike poles. Making the drive multi-sectional allows for its power to be increased.

Just like with the third embodiment, independent of the stator design the poles of adjacent disks of a multi-sectional rotor may be positioned in the axial direction both opposite each other, or in the gaps between each other. The latter arrangement provides for a steadier rotation of the rotor.

In addition, in the case when the poles of adjacent disks of a multi-sectional rotor are located in the gaps between each other, these adjacent disks may be made as one disk with poles for both adjacent sections.

Like with the third embodiment, it is possible to manufacture the rotor in such a way that the disks are integrated with the magnet serving as its poles, including a design when the magnet is manufactured of two symmetrical parts joined along the plane perpendicular to the axis of the device.

The essence of the invention in conformity with the fifth embodiment consists that in the known electric drive the rotor whereof is made of two magnetized disks mounted on a shaft with poles distributed over the outer circumference and the disks are magnetized in the axial direction, in such a manner that the poles of each disk are the like ones, and in regard to the poles of the other disk—the unlike ones, the stator being made of winding distributed over the circumference, while in accordance with the invention the rotor poles are formed by the magnetized teeth located over the outer circumference of both magnetized disks in planes perpendicular to the axis of the device rotation, and the poles of the stator windings are arranged in such a way as to allow for their end-face interaction with the rotor poles. The rotor poles of the one disk located in the axial direction opposite of the rotor poles of the other disk.

Unlike the known design, the rotor of the device being the subject of the application has no claw-shaped pole horns (poles). The rotor poles are formed by teeth located over the outer circumference of both disks, which function as magnetic circuits. This ensures streamlined manufacturing of the rotor and its structural strength. Owing to the fact that the rotor poles are located over the outer circumference of both disks in planes perpendicular to the axis of the device rotation, and the poles of the stator are arranged in such a way as to allow for their end-face interaction with the rotor poles, that allowes to make the radial size of the device smaller.

The rotor-magnetized disks could be made as flat iron disks with teeth—poles over the outer circumference and a polygonal or cylindrical magnet located between them.

As a particular example, the stator winding could be located in the space between the above-mentioned rotor poles outfitted on both disks. This will make it possible to raise the power of the drive due to the highest intensity of magnetic field in the space between the rotor poles.

The stator winding could be made in shape of a coil winding or wave winding and be made from ferromagnetic, usually steel, tape coated by copper.

Other version of the stator is a circuit board where windings are etched in metal, usually copper, layers at the both sides and have some ferromagnetic coating such, as nickel.

The other version of circuit board stator comprises a controlling device of a type H-bridge drive and a single layer of coil windings located on each side of the circuit board. Each layer comprises several pairs of coil windings and each pair is made as a spiral that extends from the center of a start coil winding to a center of an end coil winding with the same turn direction of the spiral in relation to each coil-winding center. Both layers of coil windings are the same in transparent view and shifted angularly in such a way that the center of the start coil windings from one side of the board are electrically connected through the circuit board by internal via's, which are copper plated holes, with the center of the end coil windings on the other side of the board; the circuit of said one layer of coil windings is interrupted (broken) for providing power leads to the said controlling device.

The sixth embodiment comprises the same elements as fifth embodiment but presents the multiple stage electric drive and provides more power.

The essence of the invention in conformity with the seventh embodiment consists that in the known electric drive the rotor whereof is made of two disks with magnets mounted on a shaft parallel to each other and perpendicular to axis of device rotation, the even number of magnets are distributed over the outer circumference and are magnetized in the axial direction, in such a manner that the opposite poles of the disks facing each other have opposite polarity, the adjacent poles on each disk have opposite polarity, the stator being made of coil windings distributed over the circumference with the number of poles equal to the number of magnets, while in accordance with the invention the poles of the stator windings are arranged in such a way as to allow for their end-face interaction with the rotor poles.

Unlike the known design, the rotor of the device being the subject of the application has no claw-shaped pole horns (poles). The rotor poles located over the outer circumference of both disks, which function as magnetic circuits. This ensures streamlined manufacturing of the rotor and its structural strength. Owing to the fact that the rotor poles are located over the outer circumference of both disks in planes perpendicular to the axis of the device rotation, and the poles of the stator are arranged in such a way as to allow for their end-face interaction with the rotor poles, that allowes to make the radial size of the device smaller.

As a particular example, the stator winding could be located in the space between the above-mentioned rotor poles outfitted on both disks. This will make it possible to raise the power of the drive due to the highest intensity of magnetic field in the space between the rotor poles.

The rotor disks could be made as iron disks with magnets over the outer circumference permanently attached by magnet poles.

As other version the rotor disks could be made from non-ferrous material with magnets over the outer circumference embedded in. It is possible to have over there two ferrous metal plates attached to the outer surface of each disk. These plates could be interconnected by metal cylinder to close outer magnetic flux.

The stator is a circuit board where coil windings are etched in metal, usually copper, layers on both sides and have some ferromagnetic coating such, as nickel.

An other version of the circuit board stator comprises a controlling device of a type H-bridge drive and a single layer of coil windings located on each side of the circuit board. Each layer comprises several pairs of coil windings and each pair is made as a spiral that extends from the center of a start coil winding to a center of an end coil winding with the same turn direction of the spiral in relation to each coil-winding center. Both layers of coil windings are the same in transparent view and shifted angularly in such a way that the center of the start coil windings from one side of the board are electrically connected through the circuit board by internal via's, which are copper plated holes, with the center of the end coil windings on the other side of the board; the circuit of said one layer of coil windings is interrupted (broken) for providing power leads to the said controlling device.

The other version of electric drive comprises rotor disks having the same polarity poles. It this case the number of poles of each disk is half of stator coil winding number.

The eighth embodiment comprises the same elements but metal cylinder as seventh embodiment but presents the multiple stage electric drive and provides more power.

BRIEF DESCRIPTION OF THE DRAWINGS

The essence of the invention being claimed is explained with the accompanying drawings in which like reference numerals designate like parts throughout the thereof and wherein:

FIG. 6 is the rotor of the electric drive in accordance with the first embodiment with additional L-shaped pole horns;

FIG. 6A is a cross section 6A—6A of FIG. 6;

FIG. 7 is the rotor of the electric drive in accordance with the first embodiment, where disks are integrated with the magnet;

FIG. 8 is the rotor of the electric drive in accordance with the first embodiment, where disks are integrated with the magnet and consists of two symmetrical parts joined together in the plane perpendicular to the axis of the device;

FIG. 14 is a sample rotor of the electric drive in accordance with the third embodiment, where the poles of one disk are positioned in the axial direction opposite the poles of the other disk;

FIG. 15 is a sample rotor of the electric drive in accordance with the fourth embodiment;

FIG. 16 is a sample rotor of the electric drive in accordance with the third embodiment, with one of the disks being of plate-like configuration, and the poles of both disks in the same plane;

FIG. 17 is a sample rotor of the electric drive in accordance with the third embodiment, with additional L-shaped pole horns;

FIG. 18 is the rotor of the electric drive in accordance with the third embodiment, where the disks are integrated with the magnet;

FIG. 19 is a sample rotor of the electric drive in accordance with the third embodiment, where the disks are integrated with the magnet and consists of two symmetrical parts joined together in the plane perpendicular to the axis of the device;

DETAILED DESCRIPTION OF THE PREFERRED EMBODIMENTS

Figure 1:
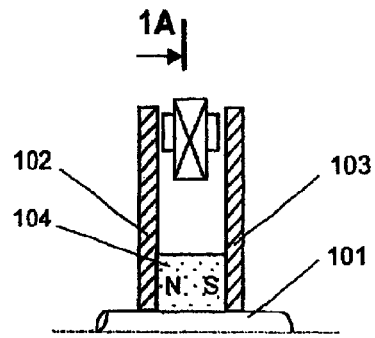
FIG. 1 is a rotor of the electric drive in conformity with the first embodiment, where the poles of one disk are positioned in the axial direction opposite the poles of the other disk.
Figure 1A:
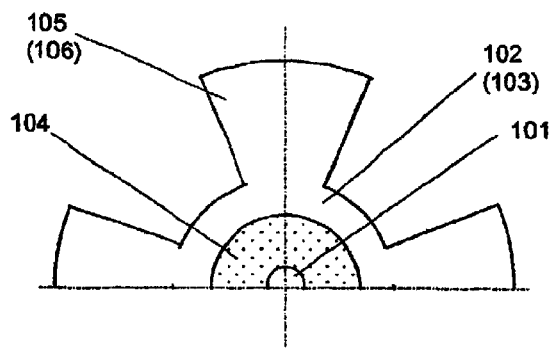
FIG. 1A is a cross section 1A—1A of FIG. 1.
Figure 2:
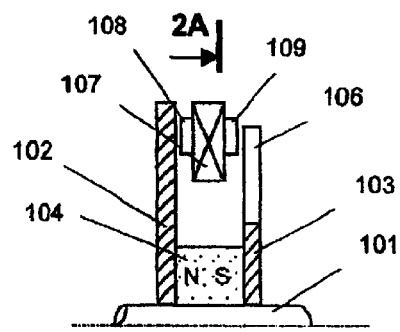
FIG. 2 is the rotor of the electric drive in accordance with the first embodiment, where the poles of one disk are positioned in the axial direction between the poles of the other disk.
Figure 2A:
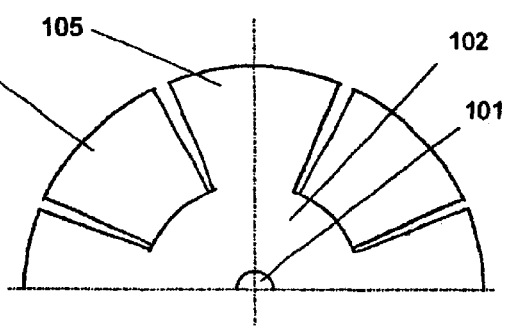
FIG. 2A is a cross section 2A—2A of FIG. 2.

The rotor of the invention in accordance with the first embodiment (FIG. 1–FIG. 6) comprises magnetized disks 102 and 103 mounted on the shaft 101, as well as the axially magnetized polygon or cylindrical magnet 104 located between disks 102 and 103 performing the function of magnetic circuits. Over their outer circumference the disks 102 and 103 have poles 105 and 106 respectively, made in the shape of radial teeth. The shaft 101 is manufactured of a non-magnetic material, brass for instance. The shaft 101 may also be manufactured of magnetic materials, steel, for instance, but in such case, to reduce magnetic losses, it would be expedient to fit it with a bushing of non-magnetic material (not shown in FIG. 1–FIG. 10) to separate the shaft 101 from the disks 102, 103 and the magnet 104. The disks 102 and 103 may be mounted in such a manner that the poles 105 and 106 will be located opposite each other (see FIGS. 1–1A), or may be turned so that in the angular direction the poles 105 will be located between the poles 106 and vice versa (see FIGS. 2–2A). Stator coil windings 107 may be installed on either side in regard to the poles 105 and 106 so that end-face interaction between them is provided. The most preferable arrangement is to install the stator coil windings 107 in the gap between the poles 105 and 106 (see FIGS. (1–17; 20–22), with pole tips 108 and 109, 208 and 209 of the stator coil windings 107 located opposite the rotor poles 105 and 106, 205 and 206 respectively.

Figure 3:
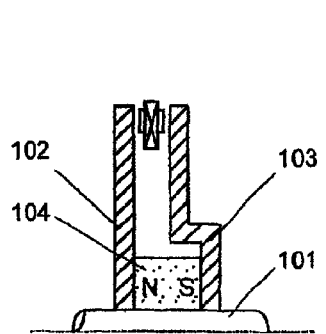
FIG. 3, FIG. 4 and FIG. 5 are samples of plate-like disks of the rotor of the electric drive in accordance with the first embodiment.
Figure 4:
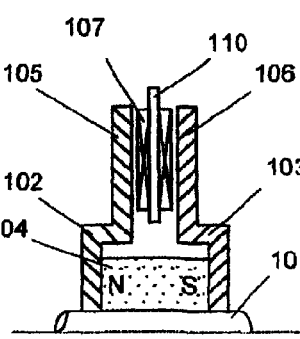
Figure 5:
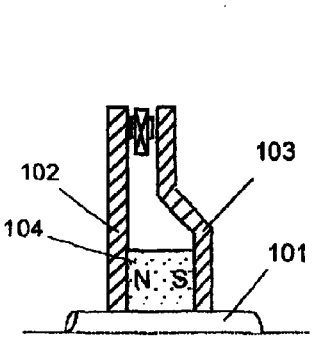

One or both of the disks 102 and 103 may be of plate-like shape, as shown in FIG. 3–FIG. 5. Such configuration helps to optimize the gap between the poles 105 and 106 independent of the axial dimension of the magnet 104 and the shape and size of the stator coil windings 107. Specifically, in FIG. 4 a design sample is shown for the case when in order to develop a strong coercive force the magnet 104 has an extensive axial dimension, and the stator coil windings 107 are made flat, for instance, like printed conductors on the circuit board 110. In such case to ensure the proper gap between the rotor poles 105, 106 and stator coil windings 107 the disks 102 and 103 are made in plate-like shape. Forming or stamping may manufacture the plate-shaped disks 102 and 103.

Another device sample is shown in FIGS. 6–6A. The electric drive comprises disks 102 and 103 mounted on the shaft 101, as well as the axially magnetized polygon or cylindrical magnet 104 located between them. Along their outer circumference disks 102 and 103 have poles 105 and 106 respectively, made in the shape of teeth. In addition poles 105 and 106 have L-shaped pole horns 111 and 112, whose one "leg" is oriented in the axial direction, and the other one is located between poles 106 and 105 respectively in the same plane with the latter. Stator coil windings 107 are located in the space formed by poles 105 and pole horns 111, and by poles 106 and pole horns 112. This arrangement makes it possible to increase the power of the electric drive.

In FIG. 7 a sample arrangement of disks 102 and 103 (FIG. 1) integrated with the magnet 104 (FIG. 1) is shown. In this case an axially magnetized annular magnet is formed to have a polygon or cylindrical part 113 and pole parts 114, 115. Here pole parts 114 and 115 have teeth performing the function of the rotor poles. In order for the stator to be installed with its coil windings located in the gap between the poles of such rotor, the stator should be made dismountable. Since it might not be always convenient, the above-mentioned annular magnet may be manufactured as two axially magnetized magnets 116 and 117 (see FIG. 8), to be assembled on the shaft 101 with their unlike poles towards each other. The latter variant is of greater convenience, as it requires simpler molds for manufacturing the magnets 116 and 117.

Figures 9, 9A:
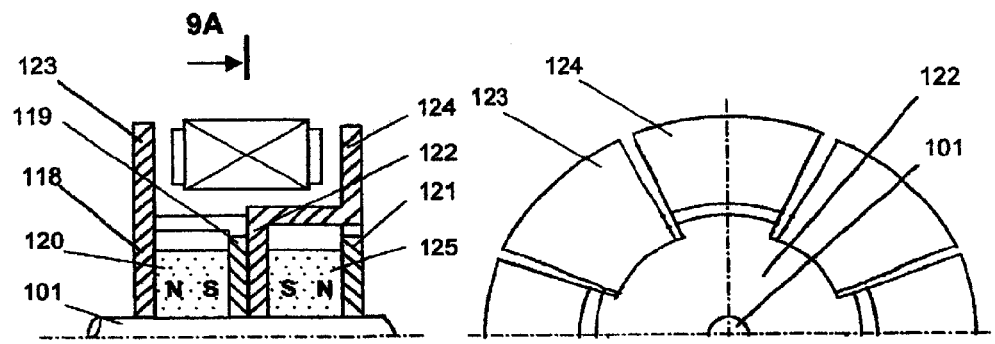
FIG. 9 is a sample two-section rotor of the electric drive in accordance with the second embodiment.
FIG. 9A is a cross section 9A—9A of FIG. 9.

In FIG. 9 and FIG. 9A the two-section rotor of the invention in accordance with the second embodiment is shown. The first section of this rotor comprises disks 118 and 119 mounted on the shaft 101, with the respective poles 123 and 124, made in the shape of teeth, as well as the axially magnetized polygon or cylindrical magnet 120 located between the disks 118 and 119 performing the function of magnetic circuits. The second section of the rotor is made in the similar fashion and comprises disks 121 and 122 mounted on the shaft 101, with the respective poles 123 and 124, made in the shape of teeth as well as the axially magnetized polygon or cylindrical magnet 125 located between disks 121 and 122. Disk 119 of the first section and disk 122 of the second section are made in a plate-like shape in such a manner that their poles are located between the poles of disks 118 and 121 respectively in the same planes with those latter. For the unification of the rotor parts all disks 118, 119, 121 and 122 may be made in the plate-like shape, of uniform dimensions, the poles of the respective disks to be located in the central section planes of both sections. When mounted on the shaft 101 both sections of the rotor are tightly fixed to each other, with magnets 120 and 125 being oriented with their like poles towards each other. To prevent the axial displacement of the sections due to the forces of repulsion developing when magnets 120 and 125 are thus installed, locking devices are provided in the design (not shown in FIG. 9). The preferred location of the stator coil windings (not shown in the drawing) is in the gap between the poles of the disks 118, 119 and 121, 122.

Similar to what is shown in FIG. 7 and FIG. 8, disks 118, 119 and magnet 120, as well as disks 121, 122 and magnet 125 may be manufactured as a single whole, or by integrating two similar parts.

Figure 10:
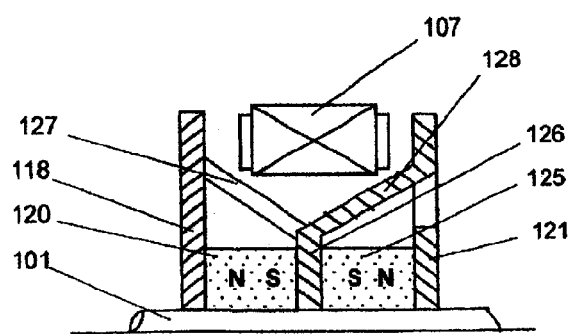
FIG. 10 is a sample two-section rotor of the electric drive in accordance with the second embodiment, for the case when the adjacent disks are made as a single disk with poles for both adjacent sections.

In FIG. 10 a device sample in accordance with the second embodiment is shown, with a two-section rotor-comprising disk 118 and magnet 120 of the first section, as well as disk 121 and magnet 125 of the first section, and disk 126 common to both sections. Teeth 127 and 128 of disk 126 are alternately bent towards the first and the second sections forming the rotor poles together with the teeth of disks 118 and 121. Stator coil windings 107 are installed in the gap between the latter.

The rotor of the invention in accordance with the third embodiment (see FIG. 11–FIG. 19) comprises disks 202 and 203 mounted on shaft 201, as well as the axially magnetized polygon or cylindrical magnet 204 located between disks 202 and 203 performing the function of magnetic circuits. Over their inner circumference disks 202 and 203 have poles 205 and 206 respectively, made in the shape of teeth oriented towards the axis of the device.

Disks 202 and 203 may be mounted in such a manner that poles 205 and 206 would be positioned opposite each other (see FIG. 11A, FIG. 13, FIG. 14), or may be turned so that in the axial direction poles 205 will be located between poles 206 and vice versa (see FIG. 15). In FIG. 14–FIG. 17, and in FIG. 20 and FIG. 21, Detail A the axial section of the rotor is shown, while in Detail B the developed view of the rotor from the axis of the device is shown.

Stator coil windings 207 may be installed on either side in regard to poles 205 and 206 in such a manner that their end-face interaction are ensured. The most preferred is the variant when stator coil windings 207 are installed in the gap between poles 205 and 206 (see FIG. 11, FIG. 13–FIG. 15), with pole tips 208 and 209 of the stator coil windings 207 (see FIG. 11) positioned opposite rotor poles 205 and 206 respectively.

Rotor disks 202 and 203 and polygon or cylindrical magnet 204 located between them (see FIGS. 11, 13) are held together, for instance, by holder 210, made in the shape of a disk of non-magnetic materials and mounted on the axle 201 by means of bearings 211. At the same time holder 210 may perform the function of a connecting element whereto the driven mechanism can be attached.

Figures 11, 11A:
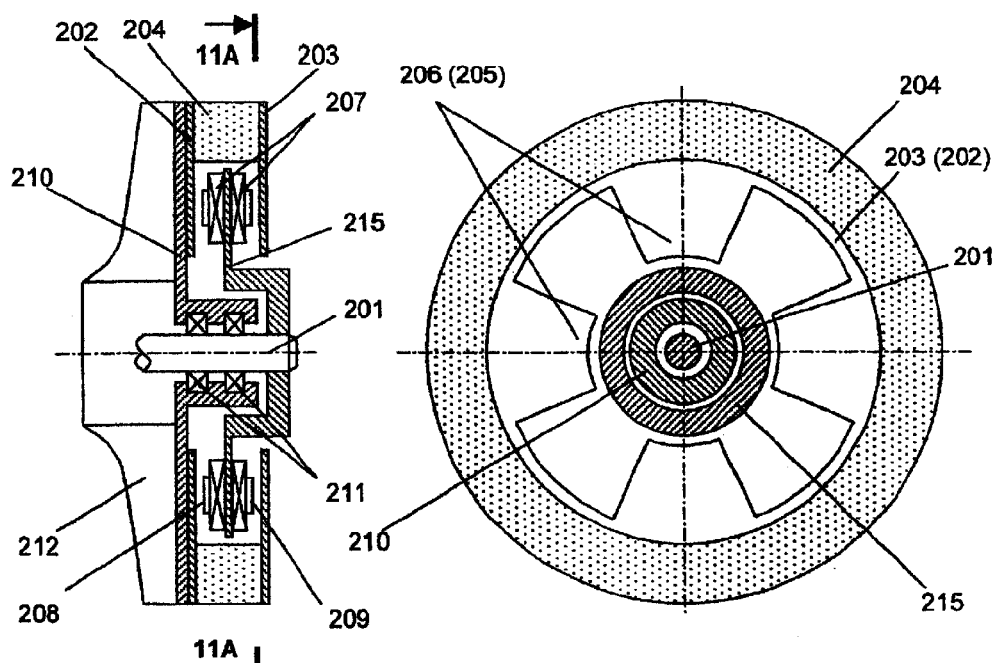
FIG. 11 is the electric drive in accordance with the third embodiment connected to an impeller of a centrifugal ventilator, as an example of possible use.
FIG. 11A is a cross section 11A—11A of FIG. 11.
Figure 12:
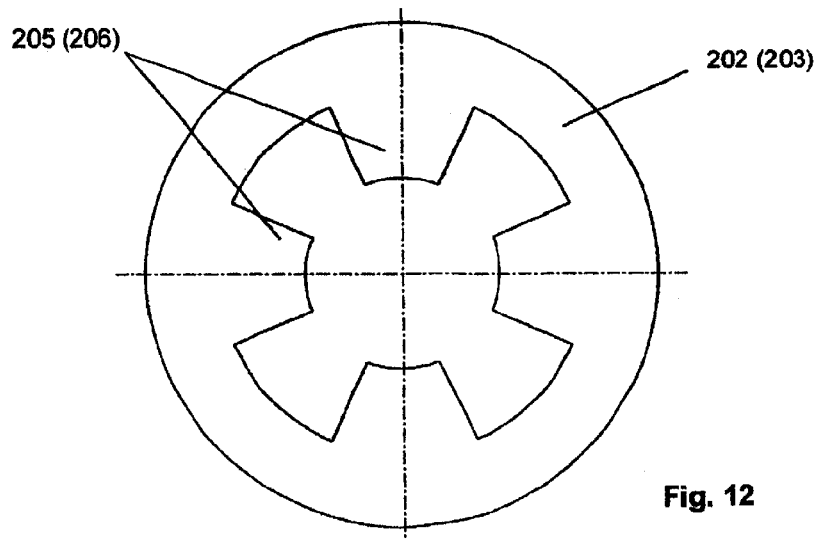
FIG. 12 is a sample design of the rotor disk.

Specifically, in FIGS. 11 and 11A a sample connection of the electric drive with a centrifugal ventilator is shown, holder 210 serving at the same time as the impeller back plate of the ventilator, with fan blades 212 attached to it.

Figure 13:
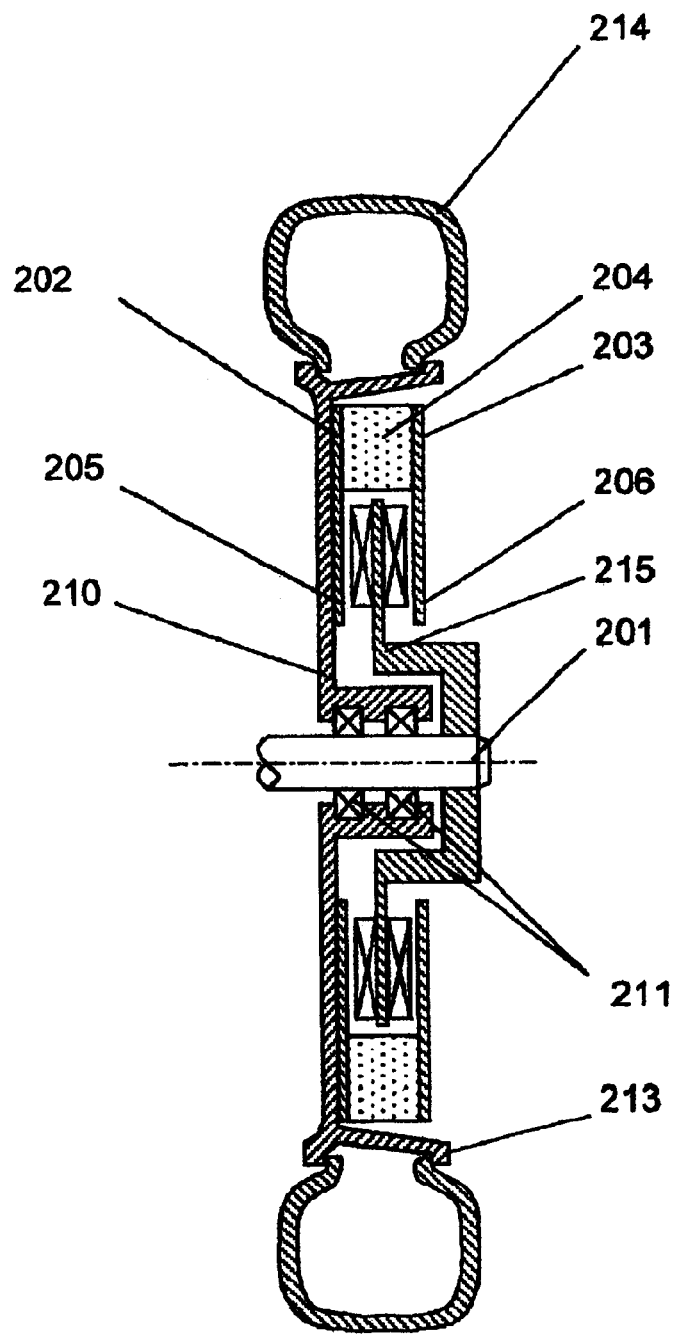
FIG. 13 is the electric drive in accordance with the third embodiment connected to the rim of a vehicle wheel, as an example of possible use.

Another example of the use of the claimed electric drive is presented in FIG. 13. It can be seen from this FIG. that holder 210 concurrently serves as a wheel rim of a transportation vehicle. Therefore, it has appropriate rim flanges 213 that hold the wheel and tire 214.

Stator coil windings 207 (see FIG. 11 and FIG. 13) are held for example, by means of holder 215 made as a disk mounted rigidly on shaft 201.

One disk either or both disks 202 and 203 can be of plate-like shape as shown in FIG. 15 and FIG. 16. Such a shape makes it possible to optimize the gap between pole 205 and pole 206—depending on the axial size of magnet 204 as well as on shape and size of stator coil windings 207.

Specifically, FIG. 15 presents an example of the embodiment of the electric drive of the present invention for the case when magnet 204 is of great axial size (needed for the purpose of providing great coercive force), while stator coil windings 207 are made flat (disk coils)—for instance, as conductor strips on a board. In this case, to set a required gap between rotor poles 205 and 206 and stator coil windings 207, disk 202 and disk 203 are made of a plate-like shape. Disks of plate-like shape (disk 202 and disk 203) could be manufactured, for instance, by the forming method.

FIG. 16 presents an example design of the claimed electric drive for the case when one of the disks (disk 203) is of plate-like shape, while at the same time poles 206 of this disk 203 are placed between poles 205 of disk 202—in one plane with poles 205. In this case stator coil windings 207 can be placed in the space formed by the concave part of disk 203 thus minimizing the axial overall size of a device.

Another example of the embodiment of a rotor for the device is presented in FIG. 17. Electric drive's rotor comprises disk 202, disk 203 and axially magnetized polygon or cylindrical magnet 204 placed between two said disks. Poles 205 and 206 are made on the inner circumference of disks 202 and 203, respectively. These poles are made in the form of teeth. In addition, poles 205 and 206 have L-shaped pole horns 216 and 217, one "leg" of which is oriented in the axial direction, while the other "leg" is located between poles 206 and 205, respectively (in one plane with the latter). Stator coil windings 207 are placed in the space formed by poles 205 and pole horns 216, and in the space formed by poles 206 and pole horns 217. Such a design makes it possible to raise the power of electric drive.

FIG. 18 illustrates an example of making disks 202 and 203 (FIG. 14) integral with magnet 204 (FIG. 14). In this case an axially magnetized annular magnet having a polygon or cylindrical part 218 and pole parts 219 and 220 is produced. In addition, the inner circumferences of pole parts 219 and 220 are shaped as tooth-like, and these teeth perform the function of rotor poles. To ensure the mounting of stator (by placing its coil windings 207 in the gap of such a rotor), the stator should be dismountable. Since it is not always convenient, said annular magnet can be made out of two axially magnetized magnets 221 and 222 (see FIG. 19) assembled in such a way that their unlike poles are located towards one another. Another convenience of this variant consists in the fact that simpler molds will be required to manufacture magnets 221 and 222.

Figure 20:
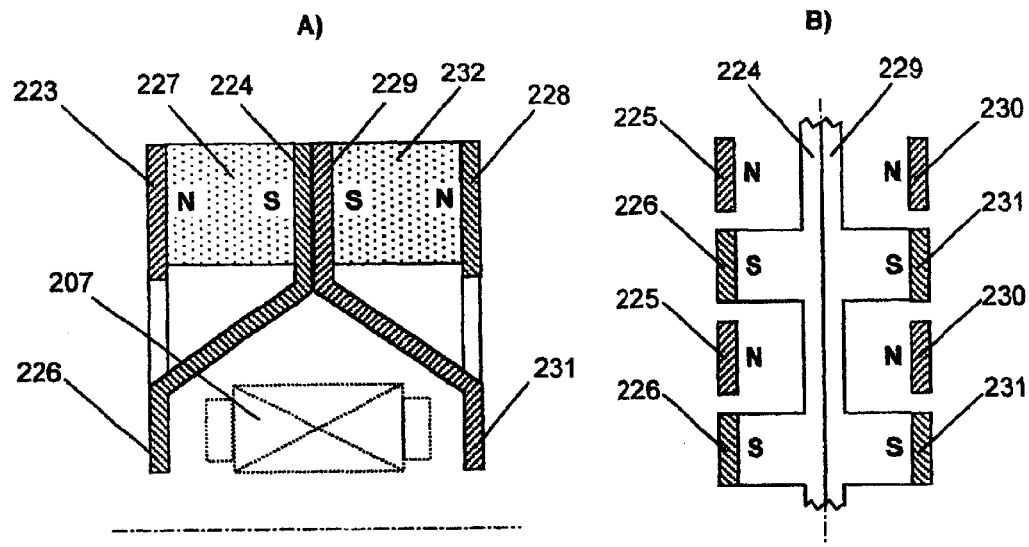
FIG. 20 is a sample two-section rotor of the electric drive in accordance with the fourth embodiment.

A two-section rotor for the electric drive of the forth embodiment is presented in FIGS. 20. The first section of this rotor comprises disks 223 and 224 with respective poles 225 and 226 (the latter are made in the form of teeth) and axially magnetized polygon or cylindrical magnet 227 placed between said disks 223 and 224 that perform the function of magnetic conductors. The second rotor section is made in a similar manner. It comprises disks 228 and 229 with respective poles 230 and 231 (the latter are made in the form of teeth) and axially magnetized polygon or cylindrical magnet 232 placed between said disks 228 and 229 that perform the function of magnetic conductors. Disk 224 of the first section and disk 229 of the second section are made of plate-like shape in such a way that their poles (pole 226 and pole 231) are placed between poles 225 of disk 223 and poles 230 of disk 228, respectively, in one and the same plane with the latter. To unify and standardize rotor parts, disks 223, 224, 228, and 229 can be made of plate-like shape and of equal size—in this case poles of appropriate disks will be located in the planes of the central cross section of both sections. In the course of assembling process, both rotor sections should be tightly joined together, while magnets 227 and 232 should be positioned so as to face each other with the like poles. To avoid axial displacement of sections (which may happen due to the repulsive force resulting from the above-described installation of magnets 227 and 232), special locking devices are provided in the design (they are not shown in FIG. 20). Placement of stator coil windings 207 in the gap between the poles of disks 223, 224 and 228, 229 is the most preferable embodiment of this option of the electric drive being claimed.

It is possible to make disks 223 and 224 integral with magnet 227 (as well as to make disks 228 and 229 integral with magnet 232), including an option when they comprises two identical parts—similar to what is shown in FIG. 18 and FIG. 19 for the third embodiment of the electric drive being claimed.

Figure 21:
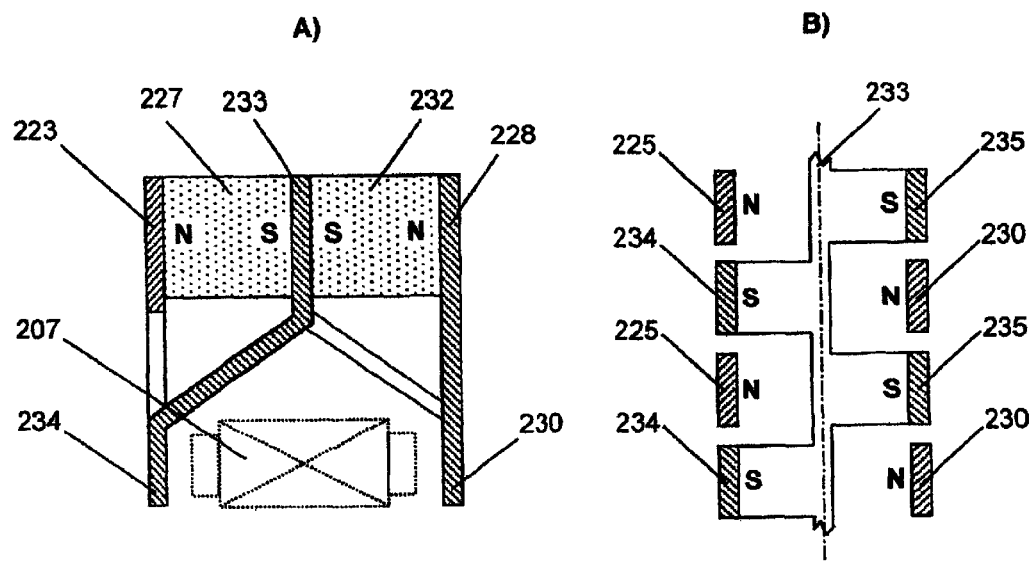
FIG. 21 is a sample two-section rotor of the electric drive in accordance with the forth embodiment, for the case when the adjacent disks are made as a single disk with poles for both adjacent sections.

An example of the electric drive design of the forth embodiment with a two-section rotor is presented in FIG. 21. This two-section rotor comprises disk 223 and magnet 227 of the first rotor section, disk 228 and magnet 232 of the second rotor section, and disk 233 that is adjacent to both sections. Teeth 234 and 235 of disk 233 are bent alternately in the direction of the first and second rotor sections, thus (together with teeth 225 of disk 233 and teeth 223 of disk 228) forming rotor poles. Stator coil windings 207 are installed in the gap formed by said rotor poles.

The operation of the devices claimed herein is based on electromagnetic interaction of alternately turned-on and turned-off stator coil windings with rotor poles and is similar to the operation of the known electric drives described above. Examples illustrating operation of all claimed embodiments of devices are presented in FIG. 22, FIG. 23, and FIG. 24, which show rotor poles 105 (205) and 106 (206), stator's electric coil winding 107 (207), and pole tips 108 (208) and 109 (209) of electric coil winding core. The arrow in the above-mentioned Figures shows the direction of rotor spinning.

Figure 22:
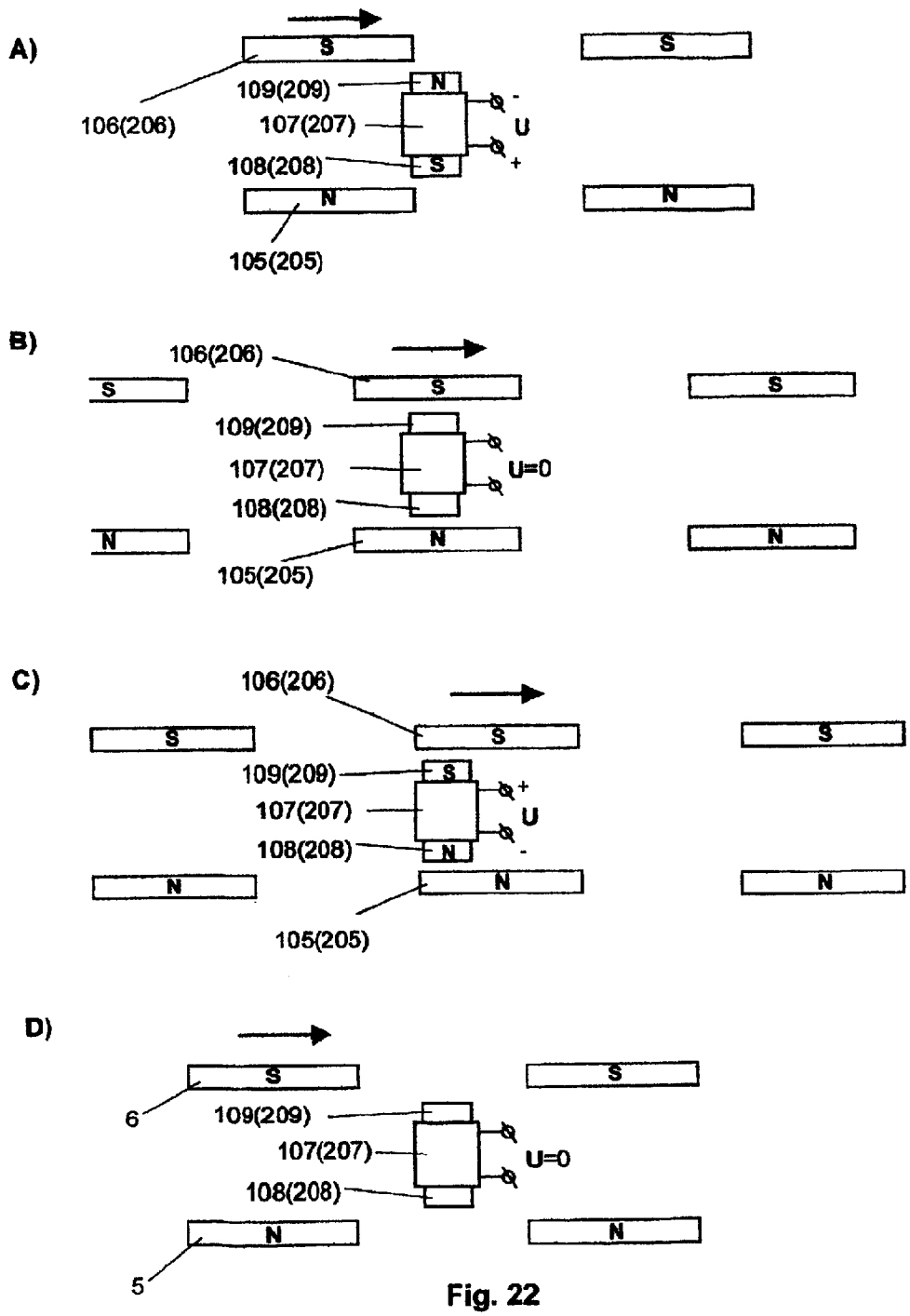
FIG. 22, FIG. 23 and FIG. 24 are samples (diagrams) of locating the stator poles versus the rotor poles, explaining the operation of all electric drive designs.

FIG. 22 illustrates a design option when unlike rotor poles 105 (205) and 106 (206) are located in different planes and oriented right opposite one another. In this case the stator (made up by coil windings 107 (207) distributed over the circumference) is placed in the gap between poles 105 (205) and 106 (206), while stator pole tips 108 (208) and 109 (209) are located opposite one another and are facing stator poles 105 (205) and 106 (206), respectively, thus providing for the end face interaction with the latter. Alternate input of voltage U to stator coil winding 107 (207), including changeover from one polarity to another, results in the production of unlike magnetic poles on pole tips 108 (208) and 109 (209). Magnetic field created between pole tips 108 (208) and 109

(209) of stator coil winding 107 (207) interacts with the constant magnetic field that exists between rotor teeth 105 (205) and 106 (206).

The sequence of switchover of stator coil winding 107 (207) depending on the position of rotor poles 105 (205) and 106 (206) is shown in FIG. 22. In the position shown in FIG. 22 a), pole tips 108 (208) and 109 (209) of stator coil winding 107 (207) attract rotor poles 105 (205) and 106 (206), the magnetization of which is of the opposite sign, which fact results in rotor spinning. When the rotor turns into a position in which the middle part of its poles 105 (205) and 106 (206) takes the position right opposite pole tips 108 (208) and 109 (209) of stator coil windings 107 (207)—see FIG. 22b),—the feeding of supply voltage U is discontinued. The rotor continues spinning due to rotary inertia and displaces into a position shown in FIG. 22c). At this point voltage U of the opposite polarity is fed to stator coil winding 107 (207), and pole tips 108 (208) and 109 (209) of stator coil winding 107 (207) begin repelling the like magnetic poles 105 (205) and 106 (206) of rotor thus spinning it in the specified direction. With further displacement of rotor into a position in which pole tips 108 (208) and 109 (209) of stator coil winding 107 (207) are placed in the middle of the space between rotor poles 105 (205) and 106 (206)—see FIG. 22d),—feeding voltage U is discontinued to be supplied to stator coil winding 107 (207). Then, after the rotor has been displaced in the direction of spinning (due to inertia), the process is repeated.

When the unlike rotor poles 105 (205) and 106 (206) are placed in one plane (FIG. 23), pole tips 108 (208) and 109 (209) of stator coil winding 107 (207) get located on one side of said plane. In this case the angular distance between pole tip 108 (208) and pole tip 109 (209) is equal to the angular distance between adjacent rotor poles 105 (205) and 106 (206). Alternate feeding of voltage U to stator coil winding 107 (207) results in the production of unlike (opposite) magnetic fields on pole tips 108 (208) and 109 (209). Said unlike magnetic fields interact with the constant magnetic field between rotor pole 105 (205) and rotor pole 106 (206).

Figure 23:
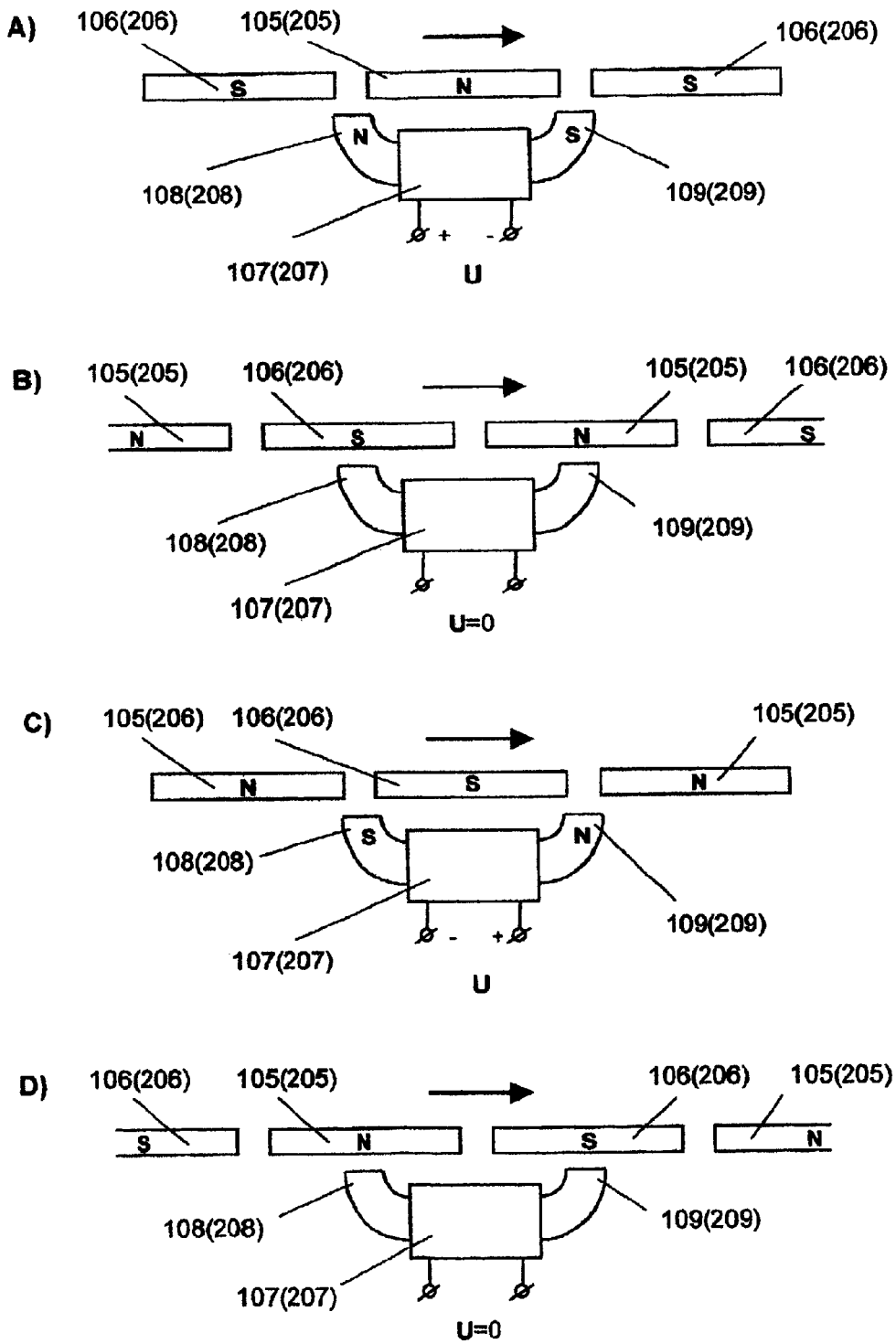

In the position depicted in FIG. 23 a), pole tips 108 (208) and 109 (209) of stator coil winding 107 (207) repel the like rotor magnetic poles 105 (205) and 106 (206), while attracting the unlike rotor magnetic poles 106 (206) and 105 (205), thus causing it to spin. When the rotor turns into a position in which the middle part of its poles 105 (205) and 106 (206) takes the position opposite pole tips 109 (209) and 108 (208) of stator coil winding 107 (207)—see FIG. 23 b),—the feeding of supply voltage U to stator coil winding 107 (207) is discontinued. The rotor continues spinning due to rotary inertia and displaces into a position shown in FIG. 23 c). Thereafter supply voltage U (of the opposite polarity) is fed to stator coil winding 107 (207). In this process, pole tips 108 (208) and 109 (209) repel the like rotor magnetic poles 106 (206) and 105 (205), while attracting the unlike rotor poles 105 (205) and 106 (206). When the rotor turns into a position in which the middle part of its poles 105 (205) and 106 (206) takes the position opposite pole tips 108 (208) and 109 (209) of stator coil winding 107 (207)—see FIG. 23D),—the feeding of supply voltage U to stator coil winding 107 (207) is discontinued. Then, after the rotor has been displaced in the direction of spinning (due to inertia), the process is repeated.

Figure 24:
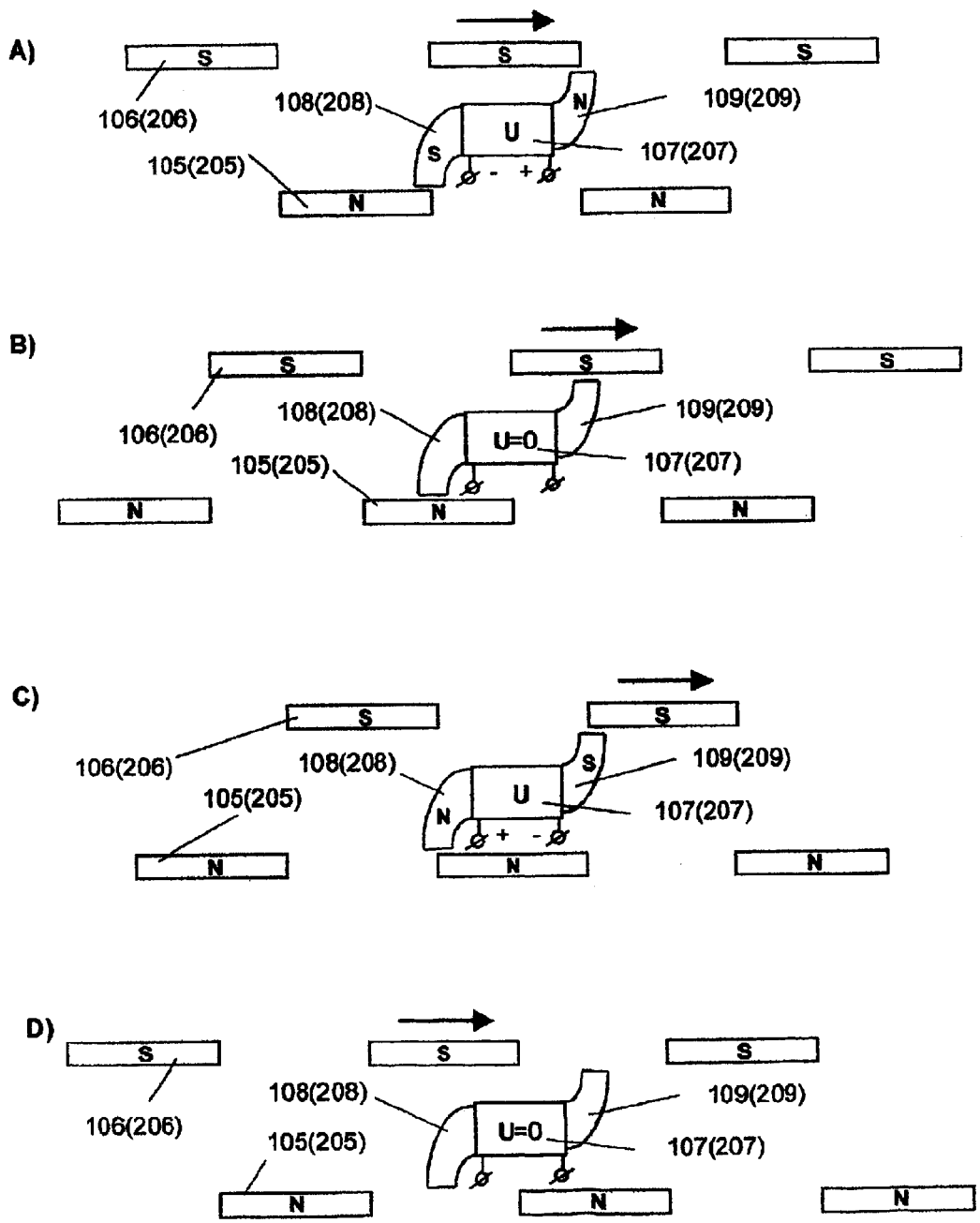

In the device embodiment in which rotor poles 105 (205) and 106 (206) are located in different planes (and in terms of the axial direction they are located one between another), the stator can be made in the form of coil windings placed over the circumference, and said coil windings have pole tips 108 (208) and 109 (209) oriented to poles 105 (205) and 106 (206), respectively. In this case the angular distance between pole tip 108 (208) and pole tip 109 (209) is chosen to be equal to the angular distance between the adjacent poles—i.e. between pole 105 (205) and pole 106 (206). FIG. 24 illustrating this example of the embodiment of the invention shows four phases of angular positions of the rotor and stages of feeding the supply voltage U to stator coil winding 107 (207) corresponding to said angular positions. Device operation in this case is similar to device operation shown in FIG. 22.

FIGS. 25–32 represent the fifth embodiment of the present invention. The magnetic rotor 301 [FIG. 26] comprises magnetized disks 303, 304 mounted perpendicularly on the shaft 302 and spaced between each other in axial direction. Disks 303, 304 are magnetized in axial direction and faced each other by opposite polarity sides. In other version disks 303, 304 are magnetized by cylindrical or polygonal magnet 305 mounted on the shaft 302 between them. The magnet 305 is magnetized in axial direction. Over their outer circumference the disks 303 and 304 have magnet poles 306 and 307 respectively, made in the shape of radial teeth. All poles 306 have the same polarity. All poles 307 have the same polarity. Poles 306 face poles 307 by opposite polarity. Location of poles 306 and 307 is similar, so that poles 306 projection on a plain perpendicular to the shaft 302 coincides with poles 307 projection on the same plane.

The stator 308 has a circumferential winding 309 and located between disks 303 and 304, so that winding 309 is located, at least partially, between poles 306 and 307. The winding comprises even number of coil winding or wave. The amount of magnet poles 306 or 307 of each magnetized disk 303 or 304 is a half of number of stator coil winding.

Figure 25:
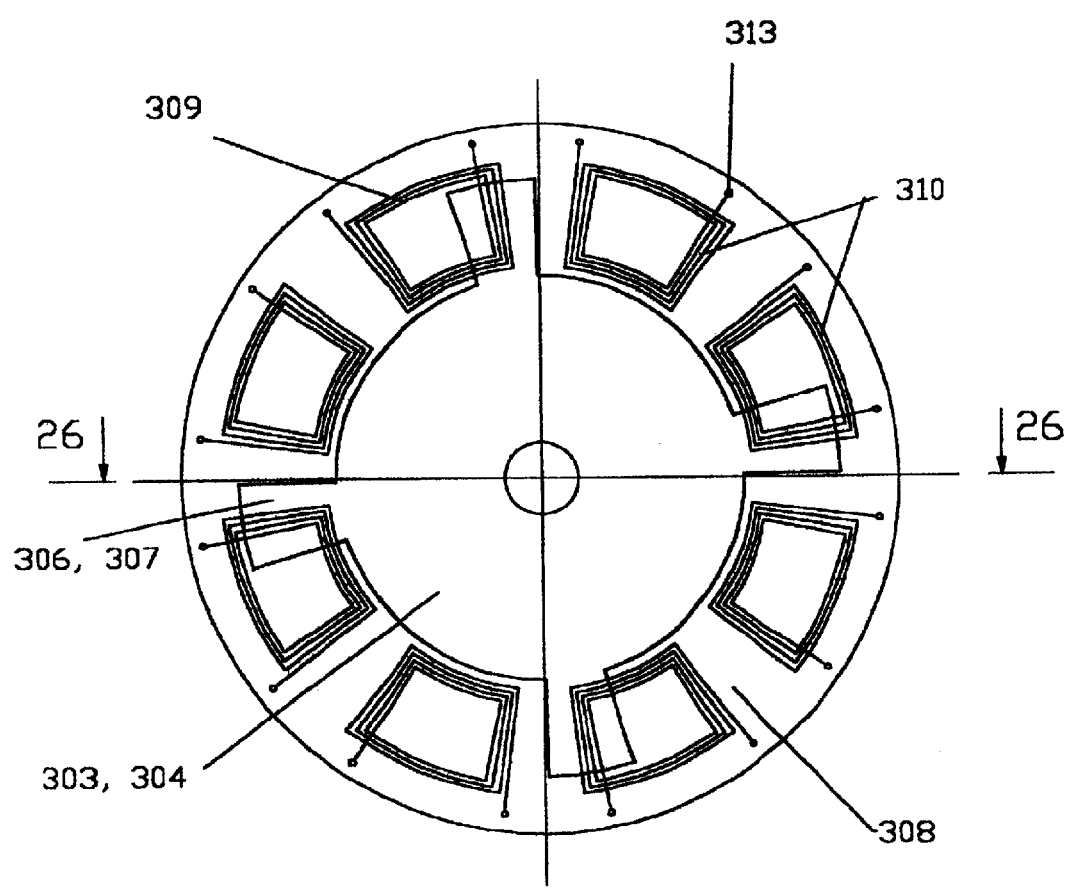
FIG. 25 is the electric drive in accordance with the fifth embodiment.
Figure 26:
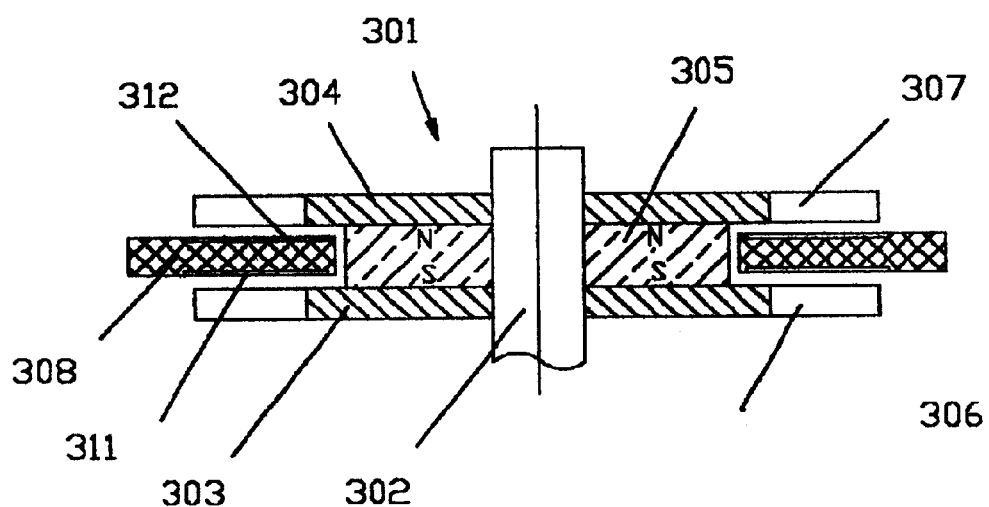
FIG. 26 is a cross section 26—26 of FIG. 25.

FIGS. 25, 26 illustrate coil windings comprising eight single coil windings 310 etched in a circuit board metal layers 311, 312 on both side of a stator and four magnet poles on each magnetized disks 303, 304. Single coil winding on different sides of the circuit board are connected each other through the circuit board by internal via's 313, which are metal, usually copper, plated holes. The axis of the each single coil winding 310 is parallel to shaft 302 axes. The metal layers of the circuit board usually are copper layers. The coil windings could be plated by ferromagnetic material, usually nickel. The plated material interacts with magnet poles providing proper rest position of disks for the best startup.

Figure 27:
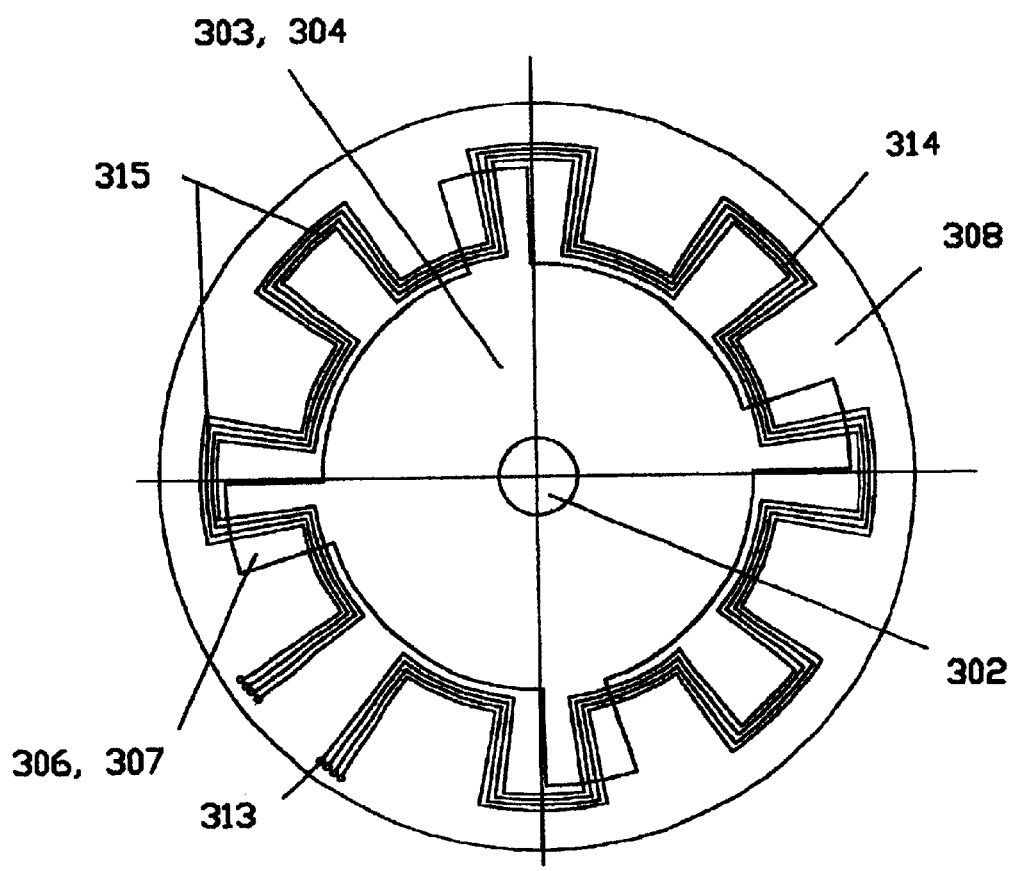
FIG. 27 is the electric drive in accordance with the fifth embodiment with windings of the stator made like wave windings.

FIG. 27 illustrates wave windings 314 comprising eight waves 315 etched in a circuit board metal layers 311, 312 on both side of a stator and four magnet poles 306, 307 on each disks 303, 304. Wave winding 315 on different sides of the circuit board are connected each other through the circuit board by internal via's 313, which are metal, usually copper, plated holes.

Figure 28:
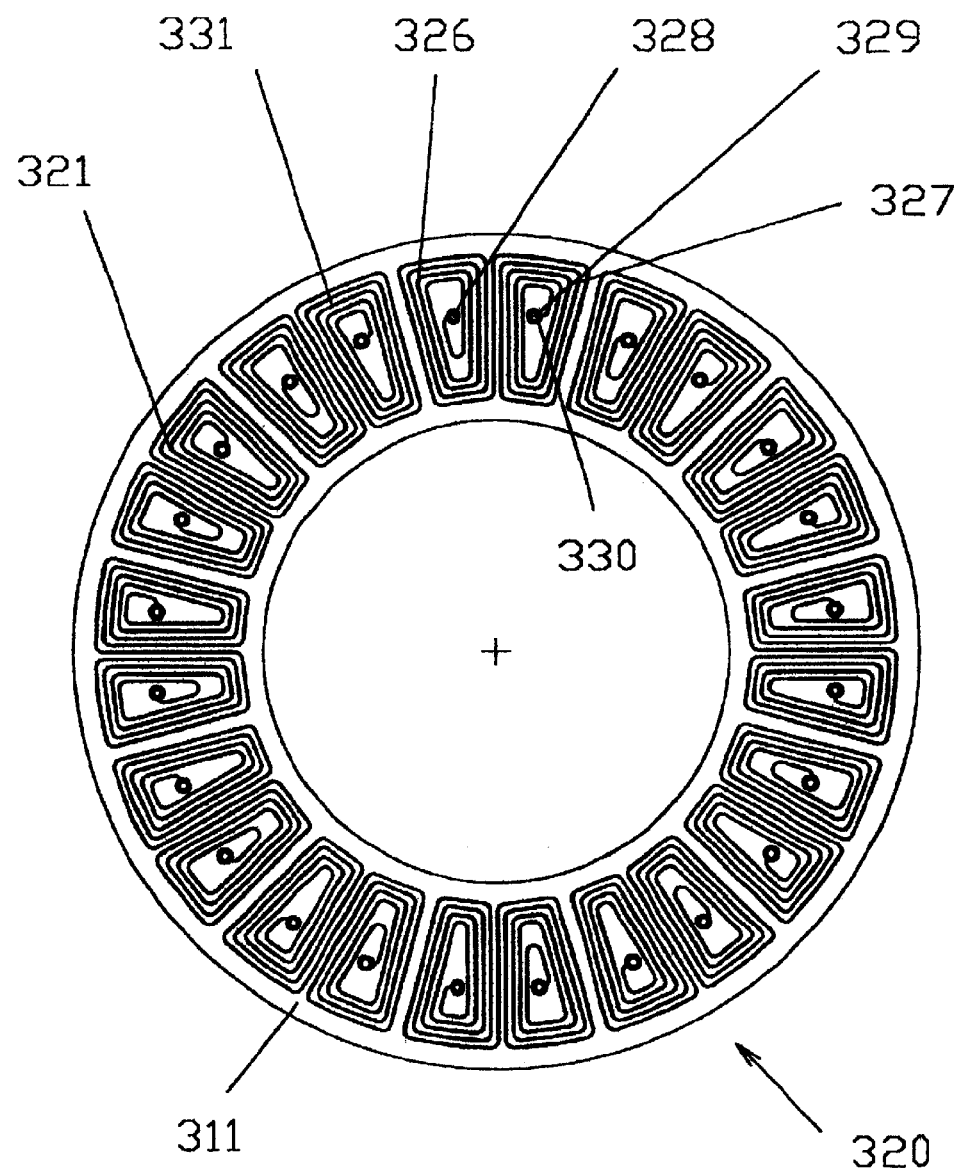
FIG. 28 illustrates the front side of the stator circuit board with 24 coil windings of the electric drive in accordance with the fifth embodiment.
Figure 29:
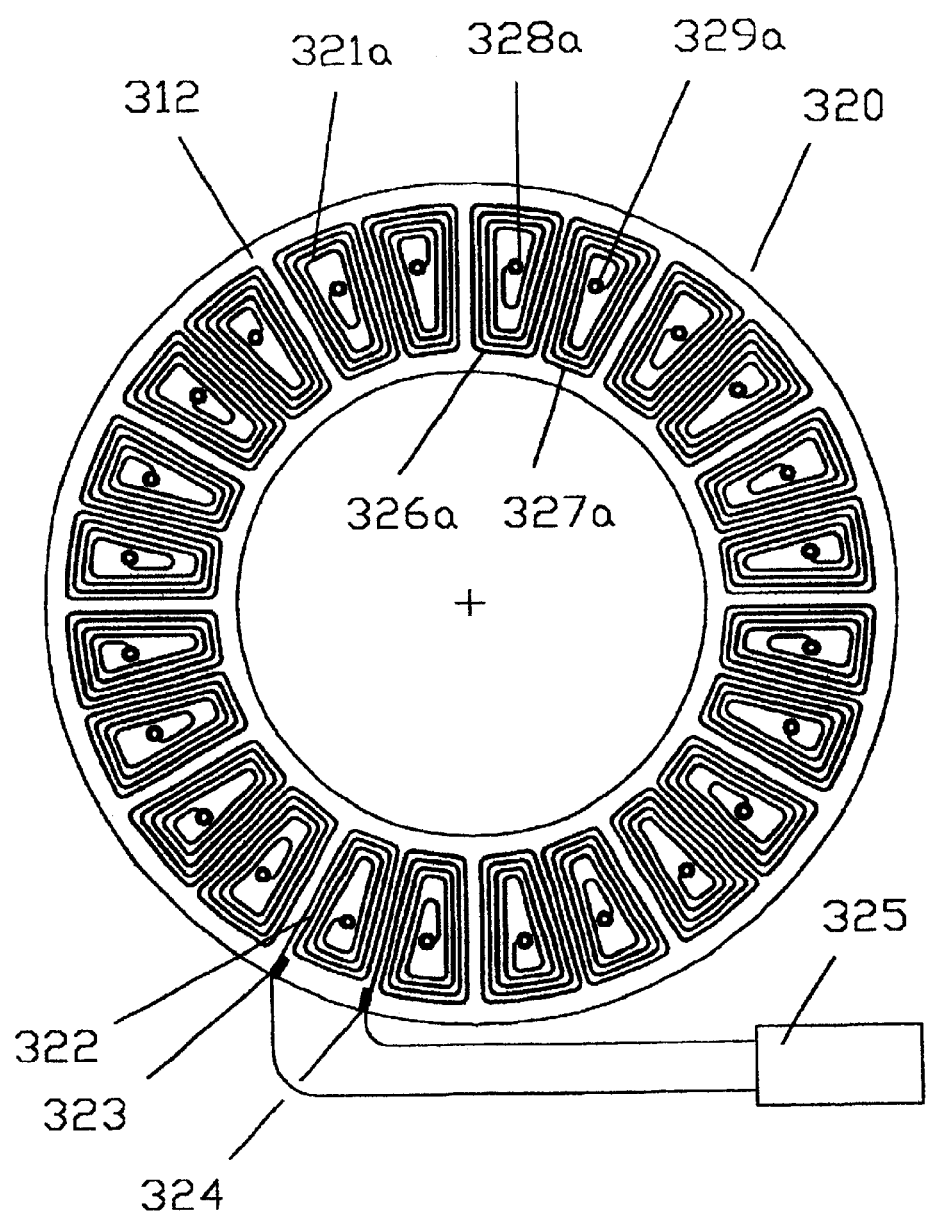
FIG. 29 illustrates the back transparent side of the stator circuit board with 24 coil windings of the electric drive in accordance with the fifth embodiment.

FIGS. 28–29 illustrate an other version of the coil windings on circuit board stator. Stator circuit board comprises twenty-four coil windings to interact with twelve magnet poles magnetized disks. FIG. 28 illustrates a front side of the stator circuit board 320 that contains coil windings 321 etched in a circuit board metal layer 311 and located around the circumference of the stator board 320. FIG. 29 illustrates a back (transparent) side of the stator circuit board 320 that contains coil windings 321 etched in a circuit board metal layer 312 and located around the circumference of the stator board 320. One coil winding 322 is interrupted (broken) for providing power leads 323 and 324 to the controlling device 325. This controlling device, for example, may be an H-bridge drive using Intersils HIP8081A integrated circuit. Controllers of this type are well known in the art of electric drive controllers.

Two layers of coil windings 321, 321 a are formed using both sides of the stator circuit board 320. Each layer 311, 312 comprises several pairs of coil winding 326 and 327 and each pair made as a spiral that extends from the center 328 of the start coil winding 326 to the center 329 of the end coil winding 327 with the same turn direction of the spiral in relation to the each enter 328 and 329. Both layers of coil windings 321 are the same in transparent view and shifted angularly such way that center 329 of the end coil winding 327 from one side of the stator circuit board electrically connected through the stator circuit board 320 by internal via's 330, which are copper plated holes, with the center 328a of the start coil winding 326a of other side of the stator circuit board 320. All pairs of coil winding around the stator circuit board 320 interconnected in this fashion. These coil windings could be plated by nickel what allows the permanent magnets 306 and 307 of the rotor 301 to align with them at rest position for proper electric drive startup.

The current direction through coil winding 326 is opposite to current direction through the adjacent coil winding 327 and 331. This yields the opposite magnetic polarities on adjacent coil windings.

Figure 30:
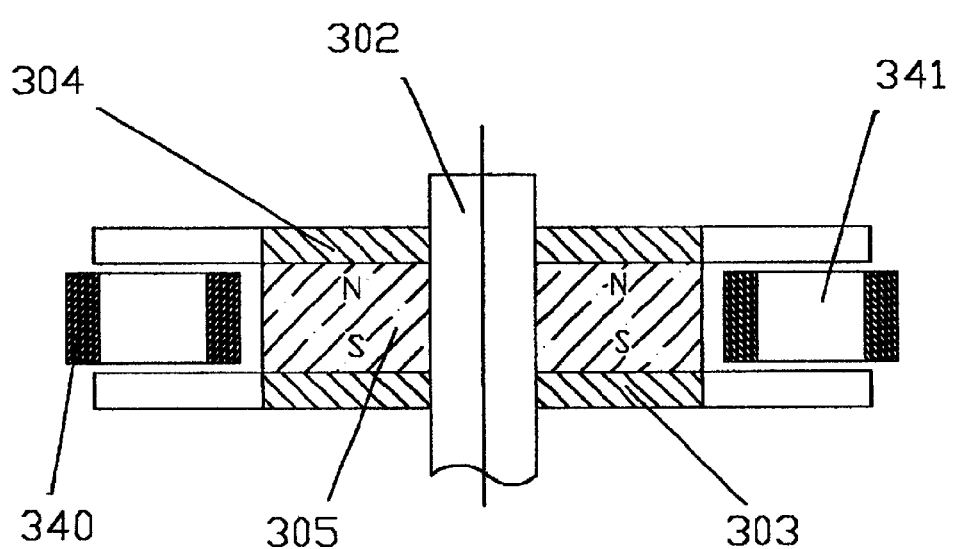
FIG. 30 illustrates the electric drive with coil windings made from ferromagnetic tape.

FIG. 30 illustrates a stator design with coil windings 340 made from ferromagnetic tape.

Figure 31:
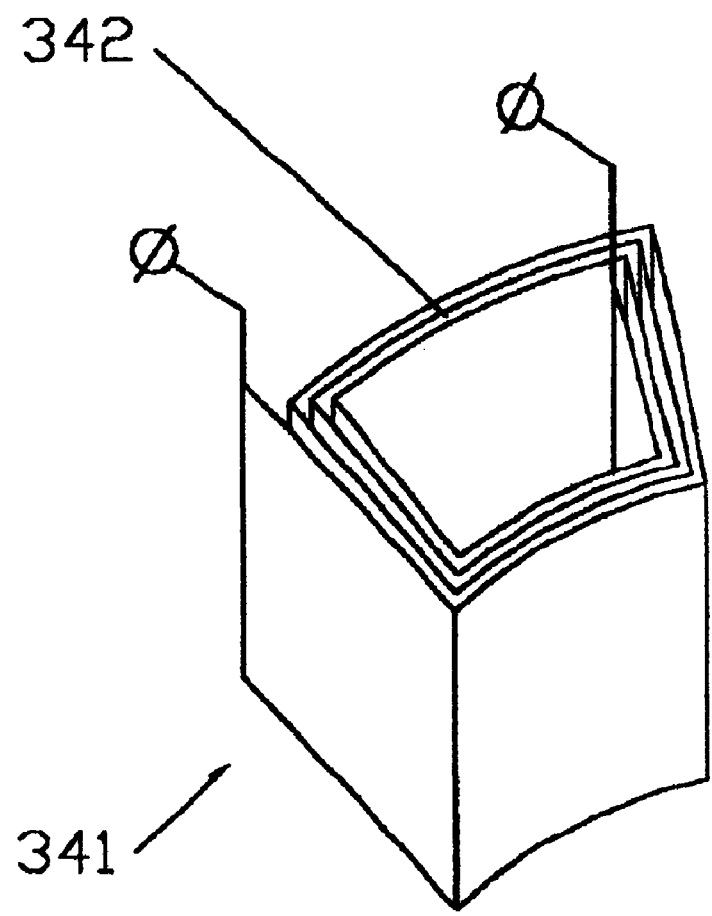
FIG. 31 illustrates the single coil winding made from ferromagnetic tape.
Figure 32:
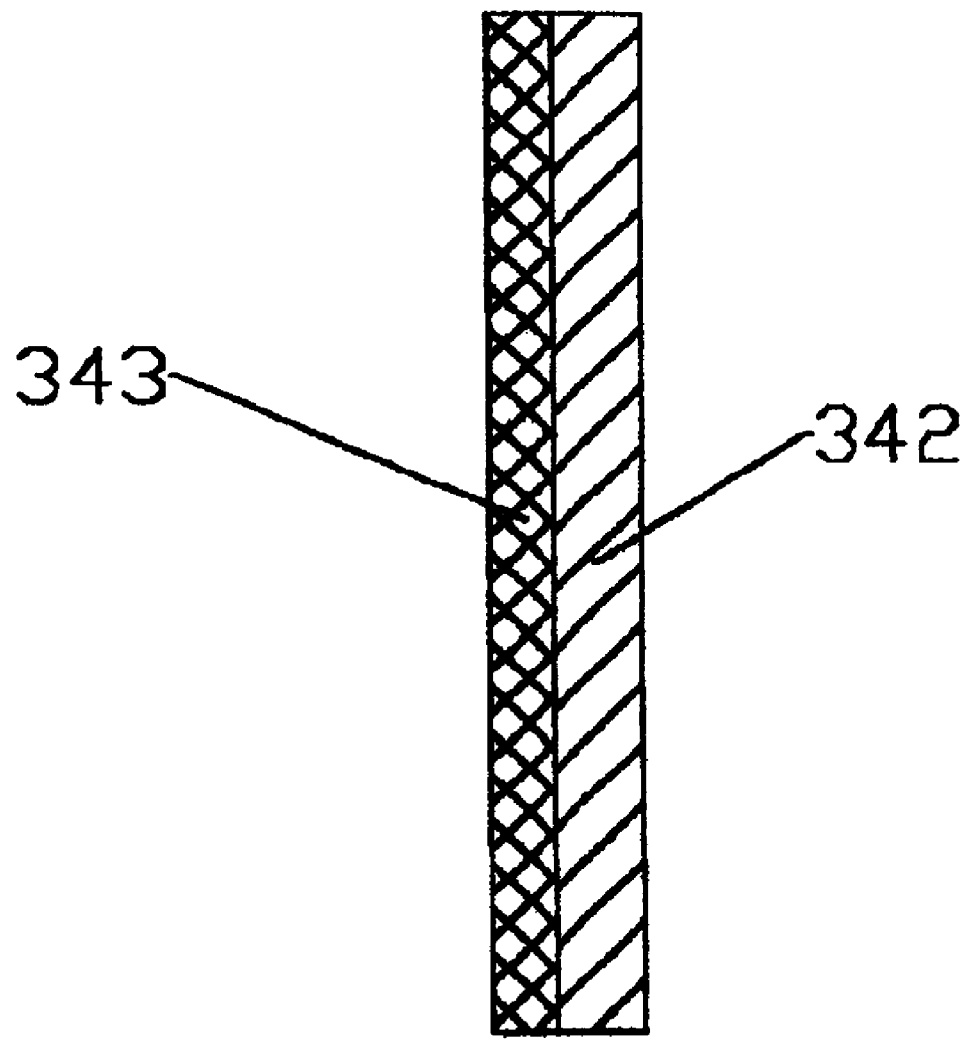
FIG. 32 illustrates the ferromagnetic tape of FIG. 31 with a high electric conductivity coating.

FIG. 31 illustrates single coil winding 341 made from ferromagnetic tape 342. The ferromagnetic tape 342 (see FIG. 32) could be made from steel and have a high electric conductivity coating 343, for example copper.

Figure 33:
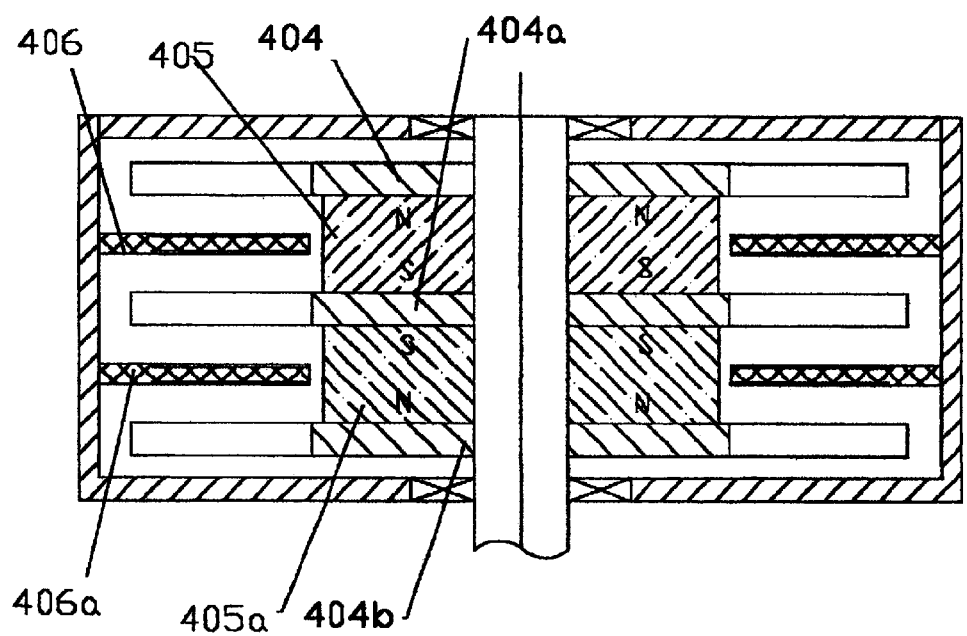
FIG. 33 illustrates a multiple stage electric drive in accordance with the sixth embodiment having two stators and three rotor disks.

FIG. 33 is an illustration of a multiple rotor disk/stator electric drive in accordance with sixth embodiment. It differs from fifth embodiment in number of magnetized disks, magnets and stators. Any number of disks 404, 404a, 404b; magnets 405, 405a and stator circuit boards 406, 406a could be joined together in this fashion to obtain a higher torque electric drive design.

FIGS. 34–43 represent a seventh embodiment.

Figure 34:
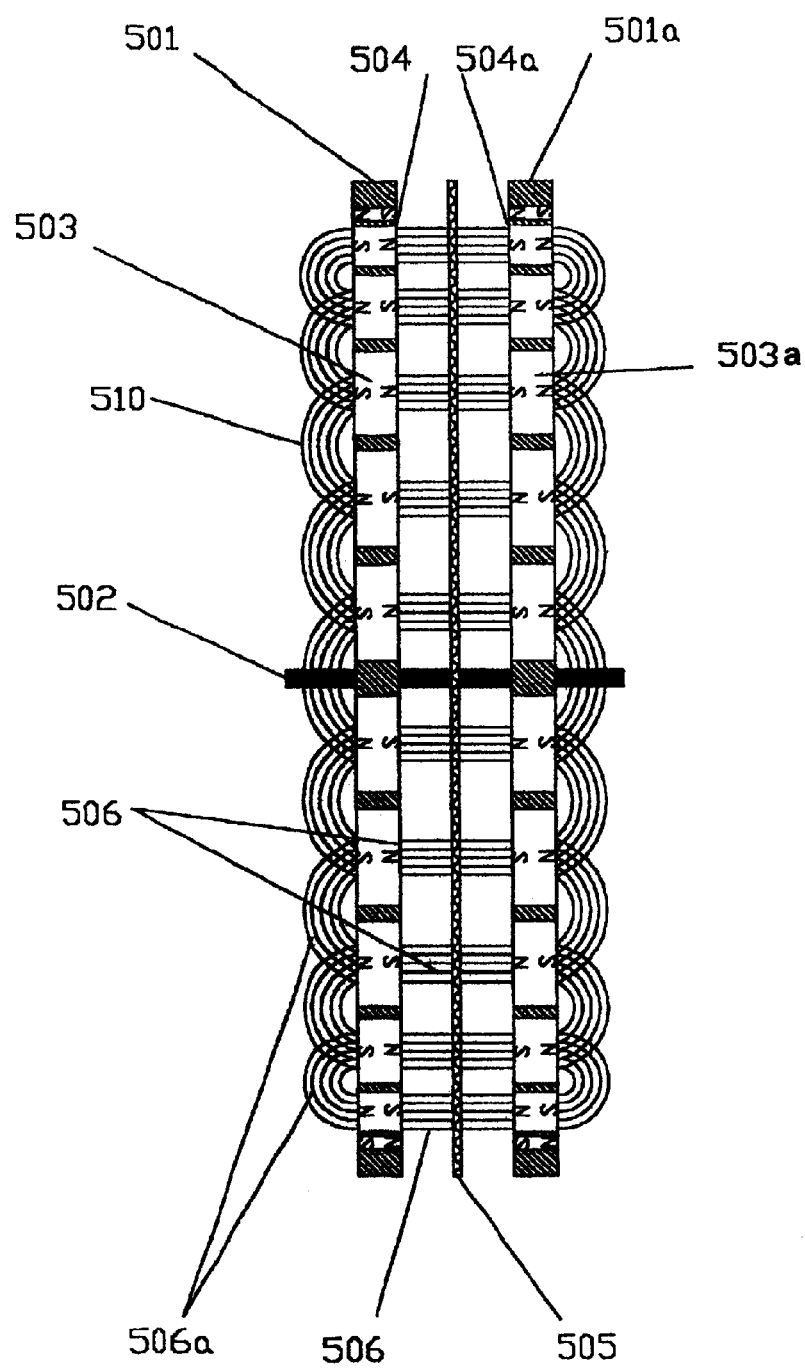
FIG. 34 illustrates the electric drive in accordance with the seventh embodiment.

The magnetic rotor 510 [See FIG. 34] of this electric drive comprises at least two disks 501 and 501a mounted parallel to each other and perpendicular to a common axis of rotation 502. All disks 501, 501a are locked to the shaft 502 to rotate together. Even number of magnets 503, 503a are affixed to and distributed around the circumference, preferable outer circumference, of each of disks 501, 501a with equal spacing between adjacent magnets 503 or 503a. It is possible also to place magnets without spacing. Poles 504 of each adjacent magnets 503 on disk 501 are opposite in magnetic polarity. Poles 504a of each adjacent magnets 503a on disk 501a are opposite in magnetic polarity. Magnets 503, 504a are embedded in a non-magnetic rotor disks 501, 501a. The stator circuit board 505 are aligned parallel with the disks 501 and 501a and located between them. Opposing magnets 503 and 503a in the disks 501 and 501a have opposite magnetic poles 504 and 504a that are facing each other and aligned in the axial direction so, that poles 504 projection on a plain perpendicular to the shaft 502 coincides with poles 504a projection on the same plain. The amount of stator coil windings is the same as amount of magnet poles 504 or 504a of each disk 501 or 501a. Each of the magnets 503 on rotor disk 501 generates strong magnetic flux lines 506 with a straight path through the stator circuit board 505 to the opposing magnet 503a on the other rotor disk 501a. Lines 506a show the shape of magnetic flux outside of the rotor disks 501 and 501a.

Figure 35:
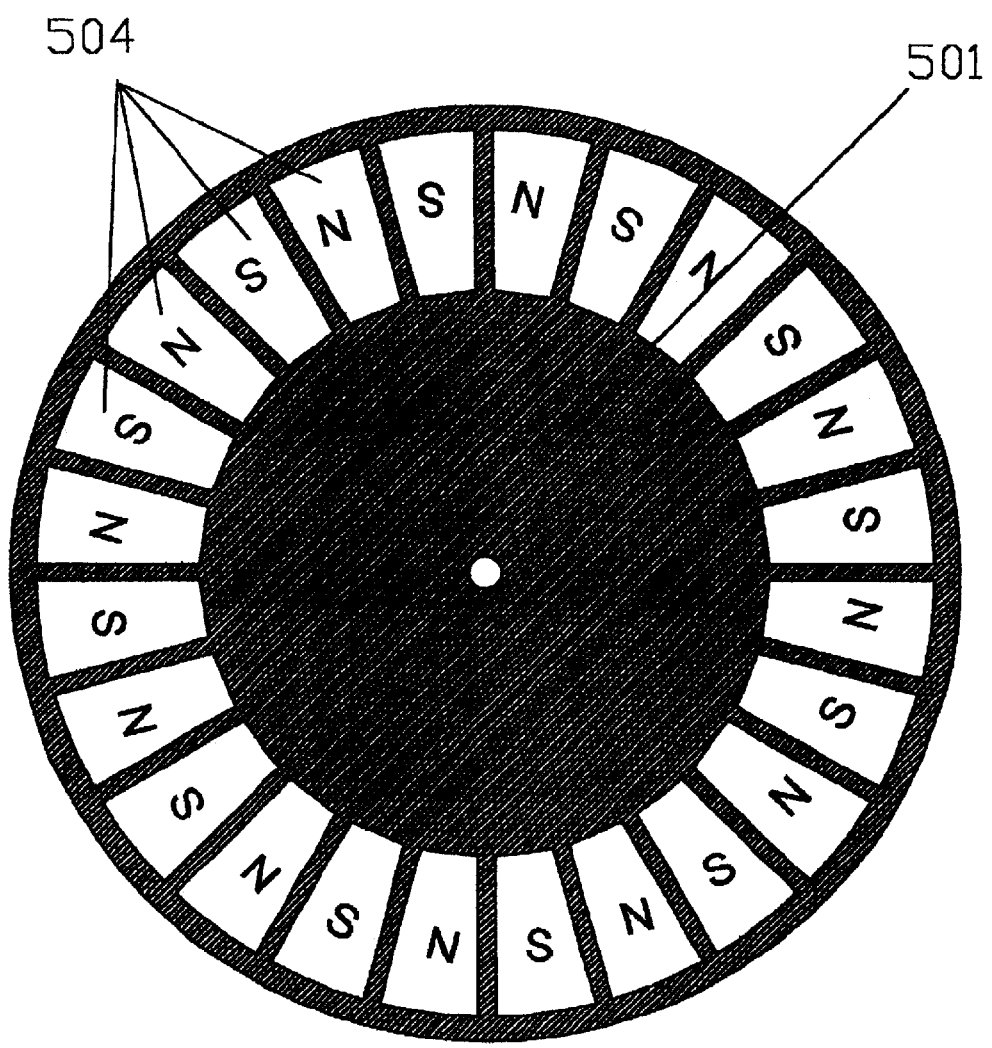
FIG. 35 illustrates one of two disks of the electric drive in accordance with the seventh embodiment of FIG. 34.

FIG. 35 illustrates an axial view of the disk 501 containing an array of twenty-four alternative polarities magnets 503 with poles 504 to interact with a stator circuit board comprising twenty-four coil windings.

Figure 36:
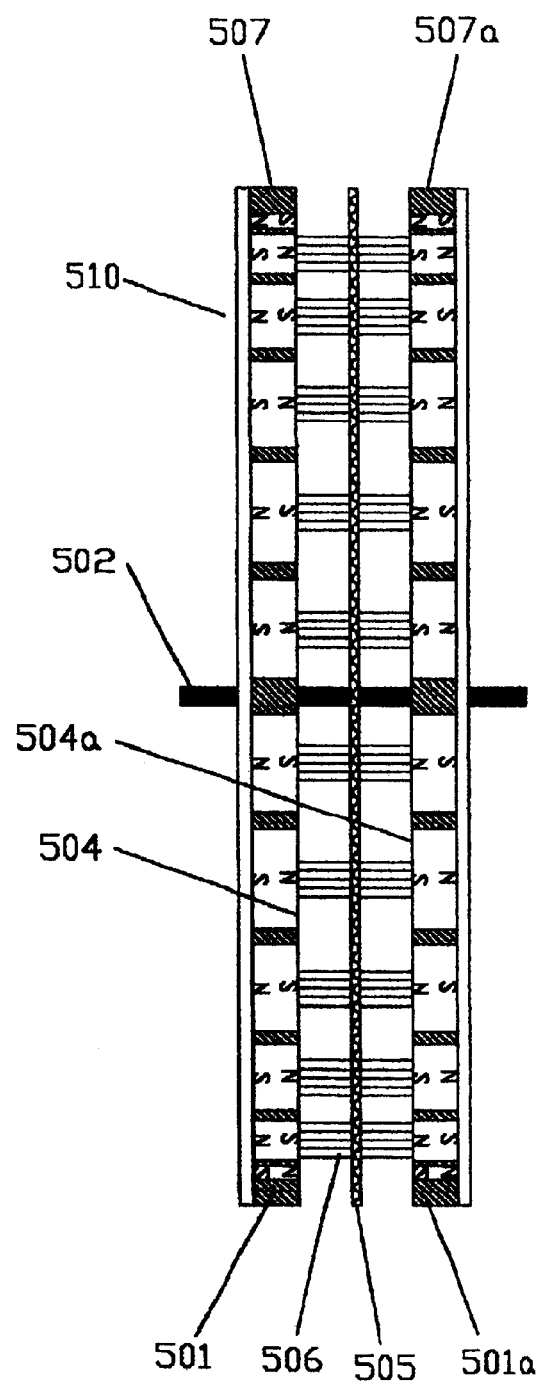
FIG. 36 illustrates the electric drive in accordance with the seventh embodiment with additional ferrous metal plates on each of the disks.

FIG. 36 illustrates another version of the motor illustrated in FIG. 34. The same rotor 510 is used with the addition of ferrous metal plates 507 and 507a attached on the outer surface of each disk 501 and 501a. These plates 507, 507a are used to concentrate and shorten the magnetic flux paths on the outer space of the disks 501, 501a yielding a stronger magnetic flux between the rotor magnet poles 504 and 504a. This results in a more efficient electric drive design. The same result may be achieved if the disks 501 and 501a are removed and the magnets 503 and 503a outer poles are attached to ferrous disks that serve as rotor disks (not illustrated).

Figure 37:
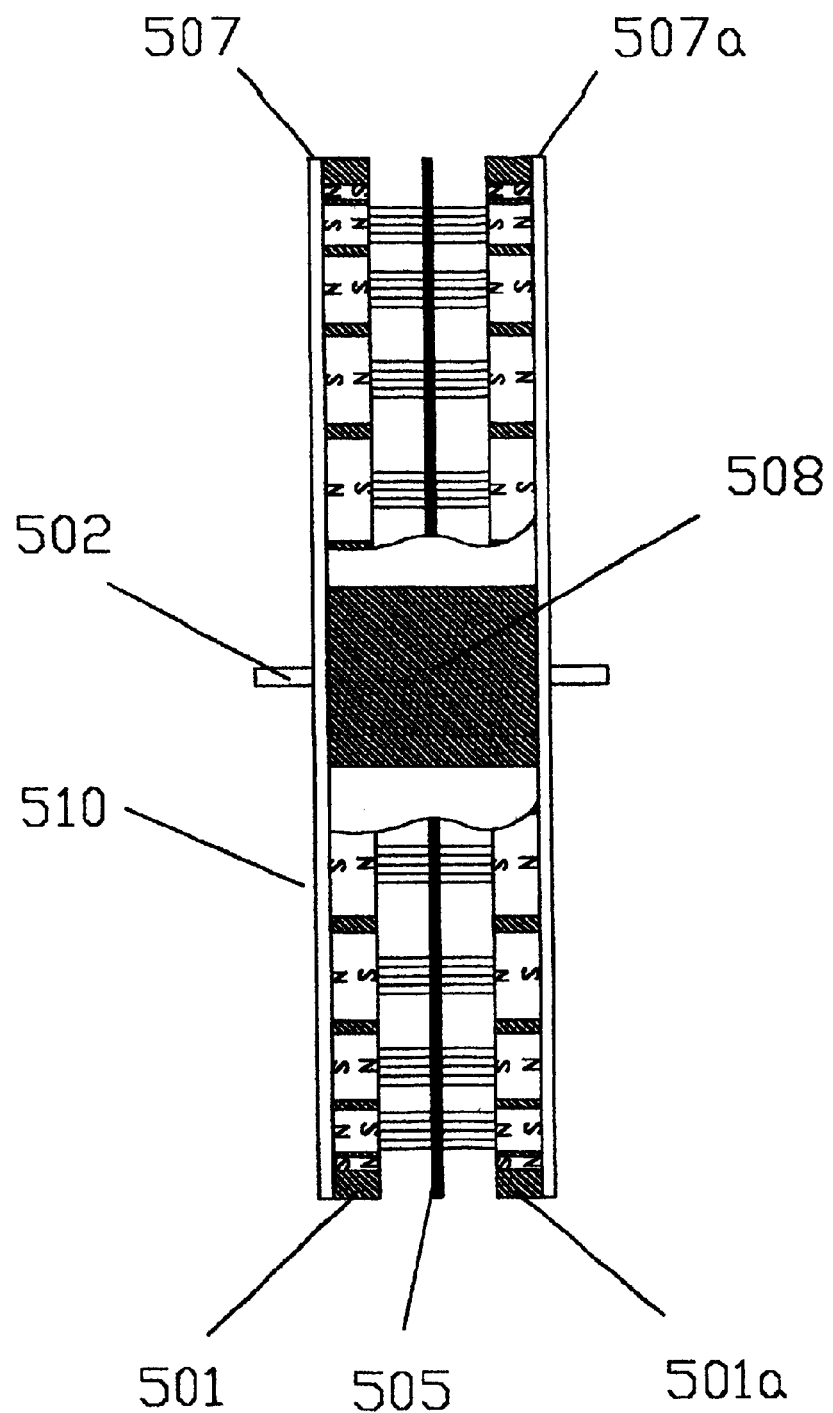
FIG. 37 is the same embodiment as on FIG. 36 with the addition of a ferrous metal bushing.

FIG. 37 is yet another version of the electric drive illustrated in FIG. 36. The same rotor 510 is used with the addition of a ferrous metal cylinder 508 interconnecting the magnetic flux between the two ferrous metal plates 507. This cylinder 508 is located around the shaft 502. This design aids in improve electric drive efficiency.

Figure 38:
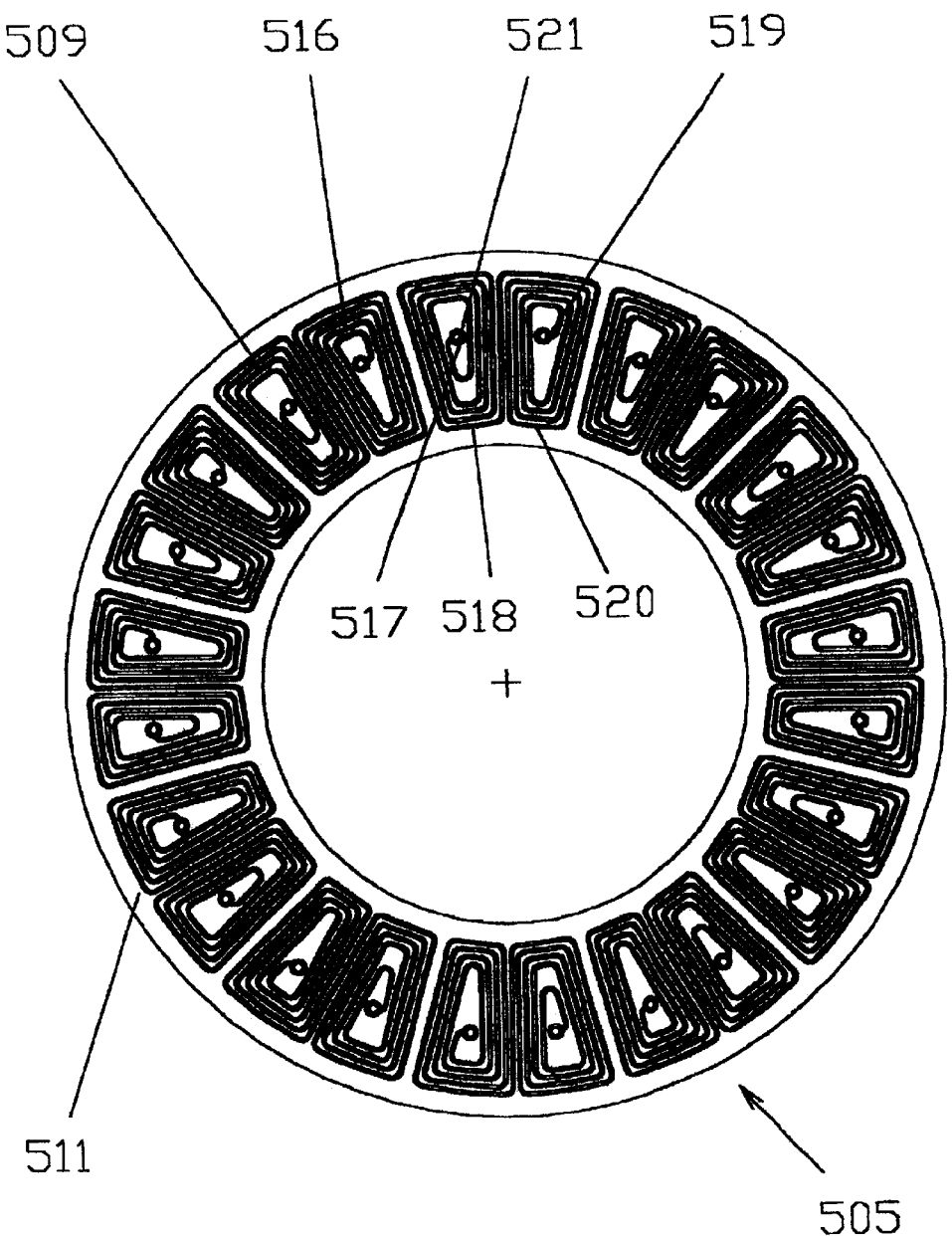
FIG. 38, the same as FIG. 28, but illustrates the front side of the stator circuit board of the electric drive in accordance with the seventh embodiment.
Figure 39:
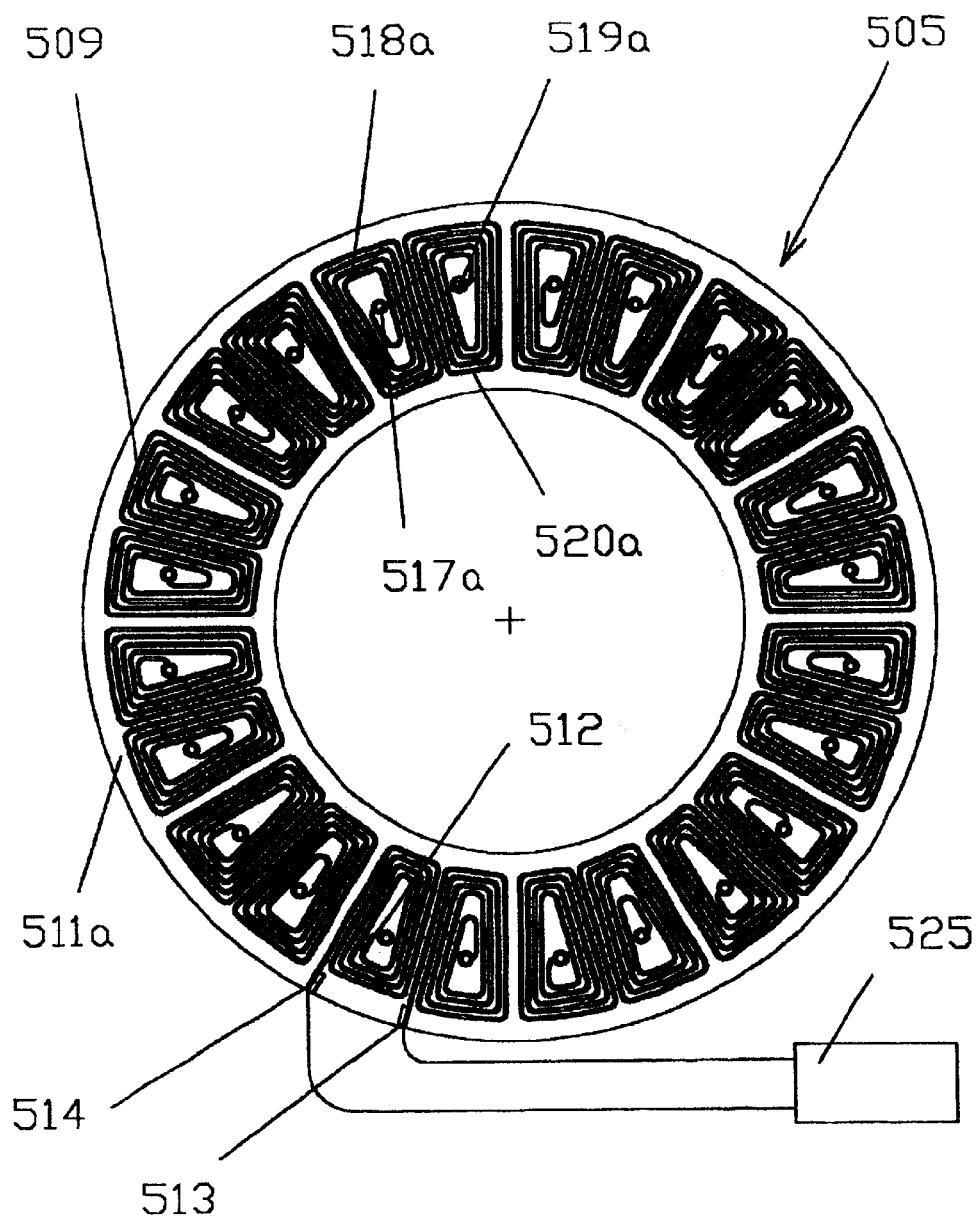
FIG. 39, the same as FIG. 28, but illustrates the back transparent side of the stator circuit board of the electric drive in accordance with the seventh embodiment.
Figure 40:
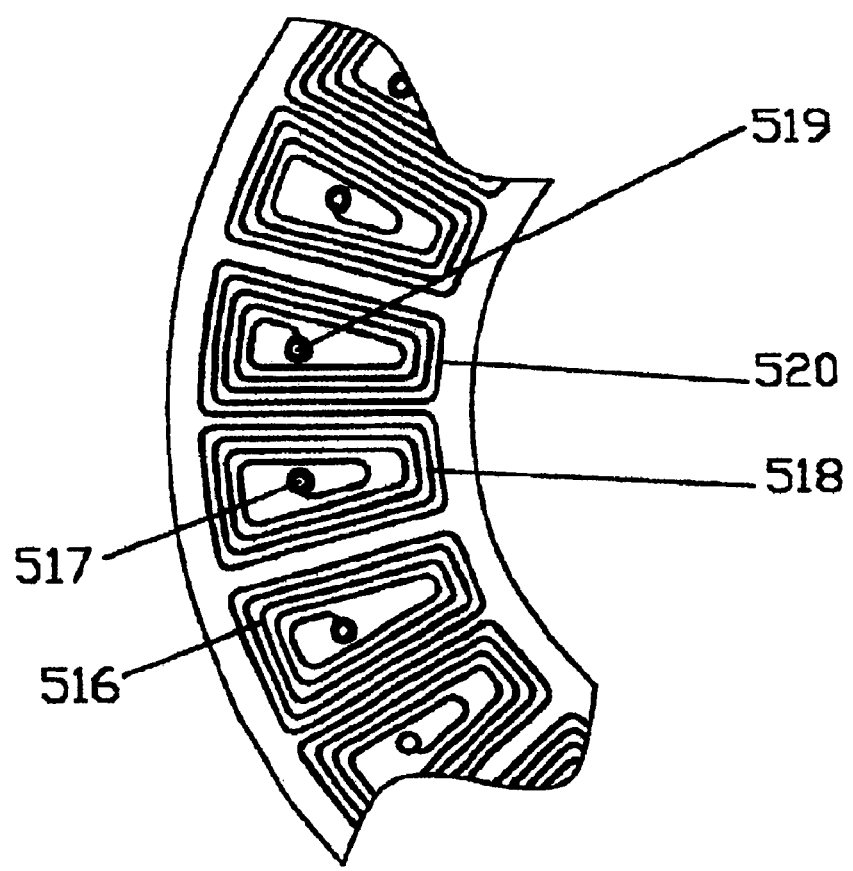
FIGS. 40 illustrates a section of the front and FIG. 41 illustrates a section of the back (transparent) of the stator board in FIGS. 38 and 39.
Figure 41:
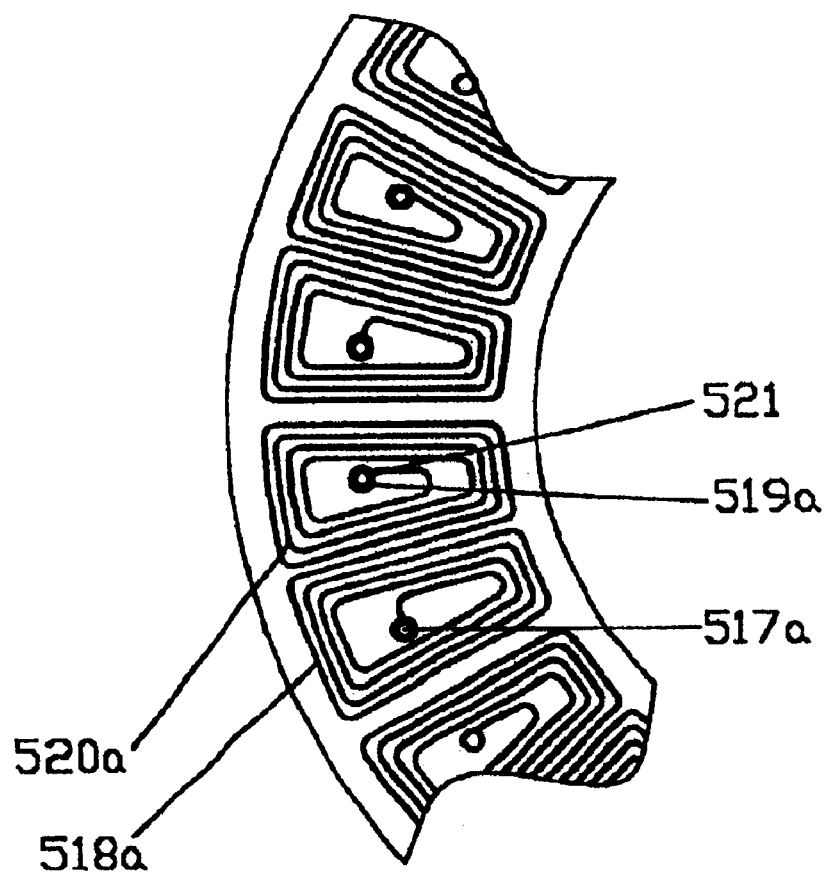

FIG. 38 illustrates a front side of the stator circuit board 505 that contains coil windings 509 etched in a circuit board metal layer substrate 511 and located around the circumference of the stator board 505. FIG. 39 illustrates a back (transparent) side of the stator circuit board 505 that contains coil windings 509 etched in a circuit board metal layer 511a and located around the circumference of the stator circuit board 505. The metal layers of stator circuit board usually are copper layers. One coil winding 512 is interrupted (broken) for providing power leads 513 and 514 to the controlling device 525. This controlling device, for example, may be an H-bridge drive using Intersils HIP8081A integrated circuit. Controllers of this type are well known in the art of electric drive controllers. FIG. 40 illustrates a section of the front side of FIG. 38 and FIG. 41 illustrates a section of the back side (transparent) of the stator circuit board 505 on FIG. 39. Two layers of coil windings 509 are formed using both sides of the stator circuit board 505. Each layer 511, 511a comprises several pairs of coil winding 518 and 520 and each pair made as a spiral that extends from the center 517 of the start coil 518 to the center 519 of the end coil 520 with the same turn direction of the spiral in relation to the each own centers 517 and 519. Both layers of coil windings 509 are the same in transparent view and shifted angularly in such a way that center 517 of the start coil winding 518 from one side of the stator circuit board is electrically connected trough the stator circuit board 505 by internal via's 521, which are metal, usually copper, plated holes, with the center 519a of the end coil winding 520a of other side of the stator circuit board 505 that extends to the center 517a of the start coil winding 518a. All pairs of coil winding around the stator circuit board 505 interconnected in this fashion. These coil windings could be plated by nickel that allows the permanent magnets 503 and 503a of the rotor 510 to align with them at rest position for proper electric drive startup.

The current passes through coil winding 518 is in the opposite direction as the current passing through the adjacent coils winding 516 and 520. This yields the opposite magnetic polarities on adjacent poles. The coil windings 509 on stator circuit board 505 form a continuous series connection of coil winding with every adjacent coil winding having the same turn direction and opposite magnetic polarity on one side of the stator board.

Figure 42:
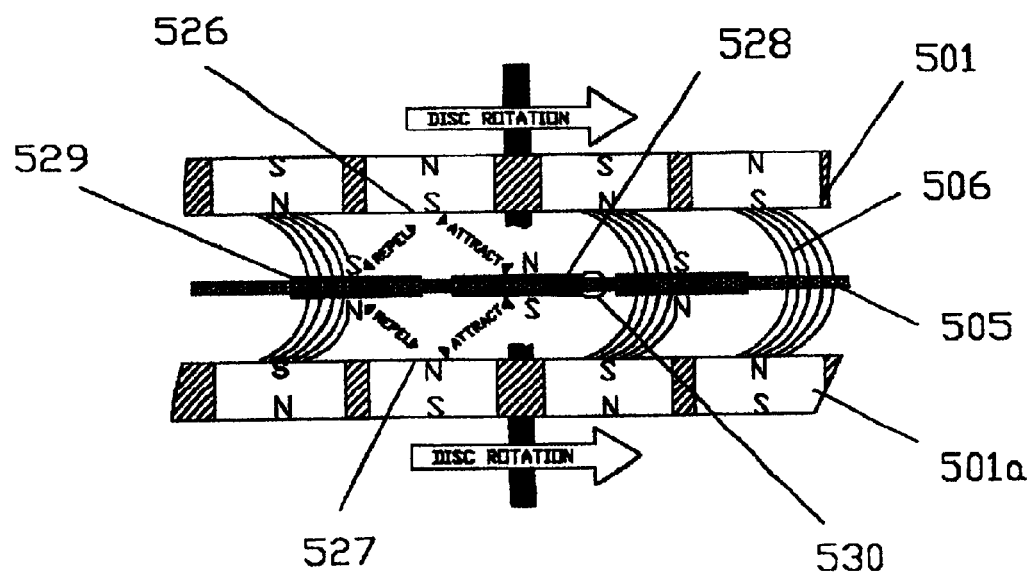
FIGS. 42 and 43 illustrate an operation of the electric drive in accordance with the seventh embodiment.
Figure 43:
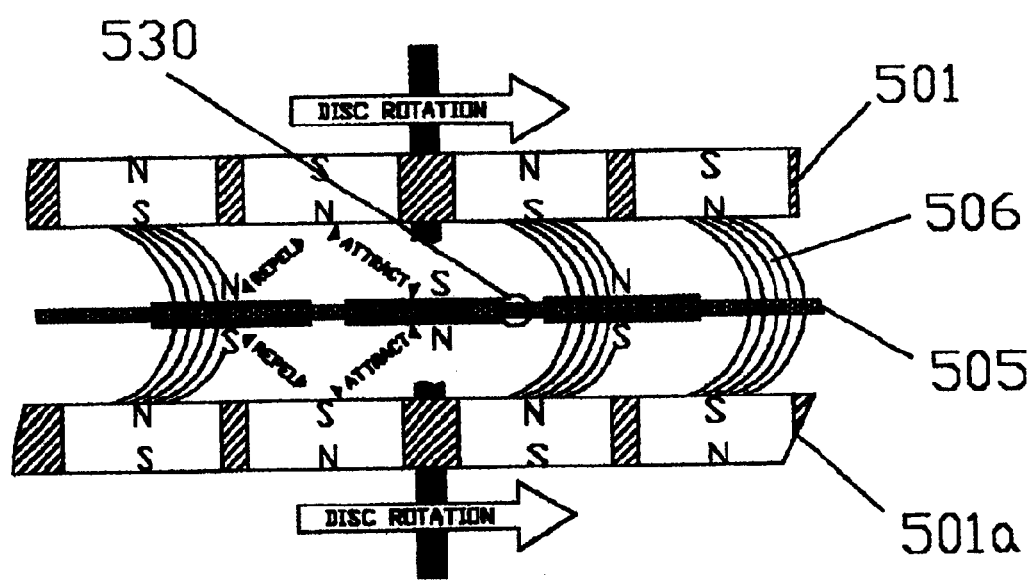

FIG. 42 illustrates operation of this motor where opposing rotor disk magnet pairs 526 and 527 are interacting with stator coil winding 528 and 529. Opposing rotor disk magnet pairs 526 and 527 are pulled towards stator coils 528 because opposite magnet poles attract each other. At the same time opposing rotor disk magnet pairs 526 and 527 are being pushed away from stator coil 529, because like magnetic poles repel each other. When the leading edge of rotor disk magnets 526 and 527 reach the magnetic sensing device 530 all of the coil windings change to the opposite polarity and the same process continues with opposite magnetic poles as illustrated in FIG. 43.

Another version of an electric drive [not illustrated] comprises the same elements but magnets 503 or 503a of the rotor disks 501 or 501a are like poles magnets. The amount of magnets 503 or 503a of each rotor disk 501 or 501a is a half of amount of coil winding on one side of stator.

Figure 44:
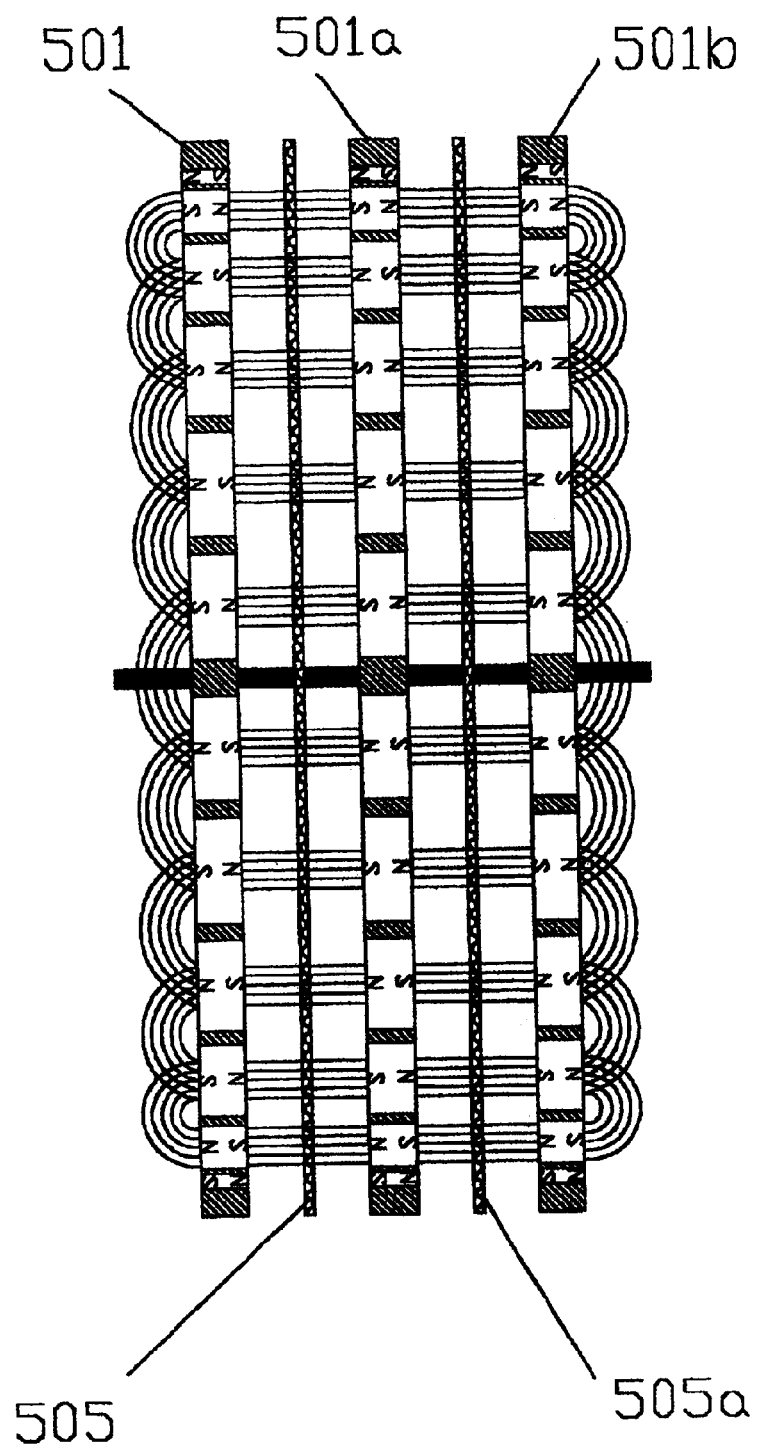
FIG. 44 is an illustration of a multiple stage electric drive in accordance with the eighth embodiment.

FIG. 44 is an illustration of a multiple rotor disk/stator electric drive in accordance with eighth embodiment. It differs from seventh embodiments in number of rotor disks and stators. Any number of disks 501, 501a, 501b and stator circuit boards 505 and 505a may be joined together in this fashion to obtain a higher torque electric drive design.

Figure 45:
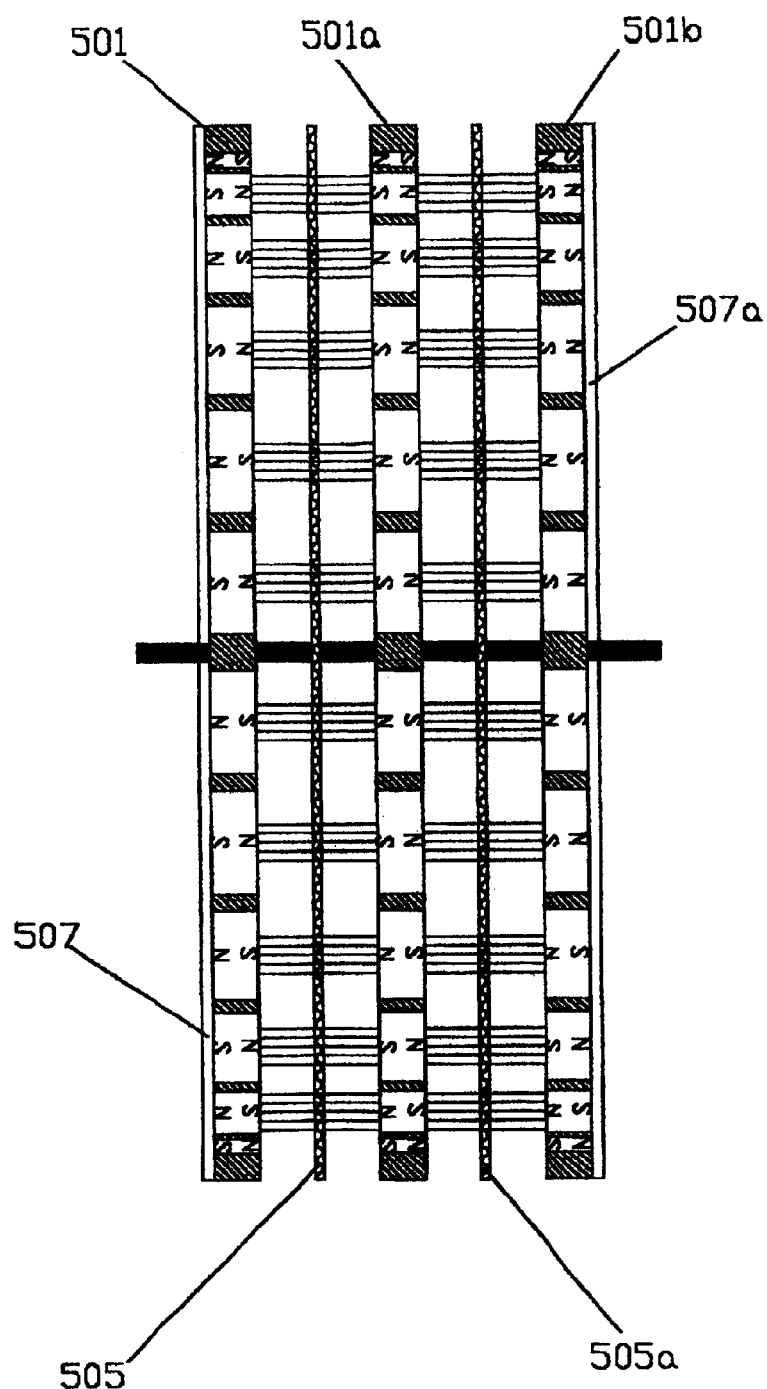
FIG. 45 illustrates a multiple stage electric drive in accordance with the eighth embodiment with additional ferrous metal plates on the outer disks.

FIG. 45 is an illustration of a multiple rotor disk/stator electric drive in accordance with eighth embodiment. There are additional metal plates 507 and 507a attached to outer surfaces of the outer rotor disks 501 and 501 b.

A possible version of the fifth, sixth, seventh, eighth embodiments could be comprised of rotor disks with magnet poles over inner circumference [not illustrated].

All embodiments of the suggested electric drive design are easy to manufacture because they consist of simple parts that are adaptable to streamlined fabrication. The gain in power of the electric drive is attained due to the increase in the radial size of polygon or cylindrical magnet.

The plate-like shape of disks makes it possible to optimize device size depending on the magnet and stator used in the device, required power, and the size of a device, in which this electric drive is supposed to be mounted.

The above-indicated properties make it possible to use the suggested electric drive in various branches of industrial application.

While the invention has been described with reference to various embodiments, it will be understood that these embodiments are only illustrative that the scope of invention is not limited to them. Many variations, modifications and improvements of the embodiments described are possible. Variations and modifications of the embodiments disclosed herein may be made based on description set forth herein, without departing from the scope and spirit of the invention as set forth in the following claims.

What is claimed is:

1. An electric drive having windings between magnetized disks comprising a magnetic rotor and at least one stator, wherein:
   (i) said magnetic rotor comprising at least two disks being made from ferromagnetic material and installed on a shaft;
   (ii) said disks being magnetized in direction parallel to said shaft;
   (iii) said stator located between said at least two magnetized disks and comprising two layers of circumferentially arrayed coil windings etched on both sides of a printed circuit board and a controlling device;
   (iv) each said layer comprising several pairs of coil windings and each said pair being made as a spiral that extends from the center of a start coil winding to the center of an end coil winding with the same turn direction of said spiral in relation to each coils winding center;
   (v) said two layers being the same in transparent view and shifted angularly, thus the center of each said start coil winding from one side of said board being electrically connected by internal via's, which are copper plated holes, with the center of each said end coil winding on the other side of said board;
   (vi) one of said coil windings being interrupted for providing power leads to said controlling device.

2. The electric drive according to claim 1, wherein said coil windings are plated with ferromagnetic coating material.

3. The electric drive according to claim 2, wherein said ferromagnetic coating material is nickel.

* * * * *